|  US011397499B2 |

(12) United States Patent
Ebisui et al.

(10) Patent No.: US 11,397,499 B2
(45) Date of Patent: Jul. 26, 2022

(54) PRESSURE-SENSITIVE SENSOR AND ELECTRONIC APPARATUS

(71) Applicant: SONY GROUP CORPORATION, Tokyo (JP)

(72) Inventors: Akira Ebisui, Tokyo (JP); Ken Kobayashi, Tokyo (JP); Yoshiaki Sakakura, Tokyo (JP); Hayato Hasegawa, Tokyo (JP); Manami Miyawaki, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 0 days.

(21) Appl. No.: 17/309,659

(22) PCT Filed: Nov. 28, 2019

(86) PCT No.: PCT/JP2019/046602
§ 371 (c)(1),
(2) Date: Jun. 14, 2021

(87) PCT Pub. No.: WO2020/129567
PCT Pub. Date: Jun. 25, 2020

(65) Prior Publication Data
US 2022/0027017 A1    Jan. 27, 2022

(30) Foreign Application Priority Data
Dec. 21, 2018  (JP) .............................. JP2018-240191

(51) Int. Cl.
*G06F 3/044* (2006.01)
*G06F 3/041* (2006.01)

(52) U.S. Cl.
CPC .......... *G06F 3/0447* (2019.05); *G06F 3/0412* (2013.01); *G06F 3/0445* (2019.05); *G06F 3/0446* (2019.05); *G06F 2203/04105* (2013.01)

(58) Field of Classification Search
CPC .... G06F 3/0446; G06F 3/0447; G06F 3/0445; G06F 3/0412; G06F 2203/04105; G01L 5/00; G01L 1/14
See application file for complete search history.

(56) References Cited

U.S. PATENT DOCUMENTS 10,474,271 B2 * 11/2019 Kim .................... G06F 3/0446
2004/0055396 A1    3/2004 Morimoto
(Continued)

FOREIGN PATENT DOCUMENTS

| JP | 2004-117042 A | 4/2004 |
| JP | 2005-164448 A | 6/2005 |

(Continued)

OTHER PUBLICATIONS

International Search Report and Written Opinion of PCT Application No. PCT/JP2019/046602, dated Feb. 25, 2020, 09 pages of ISRWO.

*Primary Examiner* — Deeprose Subedi
(74) *Attorney, Agent, or Firm* — Chip Law Group

(57) ABSTRACT

[Object] To provide a technology such as a pressure-sensitive sensor that can sufficiently ensure tolerances. [Solving Means] A pressure-sensitive sensor according to the present technology includes a sensor section, a clearance layer, and a push-in layer. The sensor section includes a sensor electrode layer, a first reference electrode layer, and a first deformable layer that is situated between the sensor electrode layer and the first reference electrode layer. The clearance layer is situated outside of the sensor section to face the first reference electrode layer. The push-in layer is situated between the first reference electrode layer and the clearance layer, and pushes the first reference electrode layer toward the sensor electrode layer in response to an external force to deform the first deformable layer.

16 Claims, 19 Drawing Sheets

(56) References Cited

U.S. PATENT DOCUMENTS

| | | |
|---|---|---|
| 2017/0177114 A1 | 6/2017 | Frey et al. |
| 2018/0032181 A1 | 2/2018 | Frey et al. |

FOREIGN PATENT DOCUMENTS

| | | |
|---|---|---|
| JP | 2015-105945 A | 6/2015 |
| JP | 2018-155711 A | 10/2018 |
| TW | 201629448 A | 8/2016 |
| WO | 2005/054802 A1 | 6/2005 |
| WO | 2016/022778 A1 | 2/2016 |
| WO | 2018/151268 A1 | 8/2018 |
| WO | 2018/173366 A1 | 9/2018 |

\* cited by examiner

| | Clearance layer | Push-in layer | Electrode film layer | Deformable layer | Sensitivity at time of deformation of 5 μm (SNR) | Range of ensuring of tolerances when SNR is 5 or more (μm) |
|---|---|---|---|---|---|---|
| First example | SS-24P(300um) | Neo Fix patterning(200um) | SF-PC5900-C(67um) | Neo Fix patterning(200um) | 13 | 270 |
| Second example | SS-24P(500um) | Neo Fix patterning(200um) | SF-PC5900-C(67um) | Neo Fix patterning(200um) | 20 | 150 |
| Third example | SS-24P(300um) | Neo Fix patterning(100um) | SF-PC5900-C(67um) | Neo Fix patterning(200um) | 30 | 140 |
| Fourth example | SS-24P(300um) | Neo Fix patterning(200um) | SF-PC5900-C(67um) | Neo Fix patterning(100um) | 40 | 140 |
| Fifth example | SS-24P(300um) | Neo Fix patterning(200um) | METALITE(50um) | Neo Fix patterning(200um) | 20 | 230 |
| Sixth example | SS-24P(500um) | Neo Fix patterning(200um) | METALITE(50um) | Neo Fix patterning(200um) | 10 | 290 |
| First comparative example | SS-24P(300um) | — | SF-PC5900-C(67um) | Neo Fix patterning(200um) | 60 | 100 |
| Second comparative example | — | Neo Fix patterning(200um) | SF-PC5900-C(67um) | Neo Fix patterning(200um) | 60 | 90 |

FIG.18

| | Electrode film layer | First deformable layer | Second deformable layer | Sensitivity at time of deformation of 5 μm (SNR) | Range of ensuring of tolerances when SNR is 5 or more (μm) |
|---|---|---|---|---|---|
| Seventh example | SF-PC5900-C(67um) | Neo Fix patterning(100um) | SS-24P(300um) | 15 | 270 |
| Eighth example | SF-PC5900-C(67um) | Neo Fix patterning(100um) | SS-24P(500um) | 10 | 250 |
| Ninth example | SF-PC5900-C(67um) | Neo Fix patterning(200um) | SS-24P(300um) | 10 | 200 |
| Third comparative example | SF-PC5900-C(67um) | Neo Fix patterning(100um) | N/A (Neo Fix 100, fixation layer only) | 15 | 100 |
| Fourth comparative example | SF-PC5900-C(67um) | SS-24P(300um) | N/A (Neo Fix 100, fixation layer only) | 15 | 120 |

F I G . 27

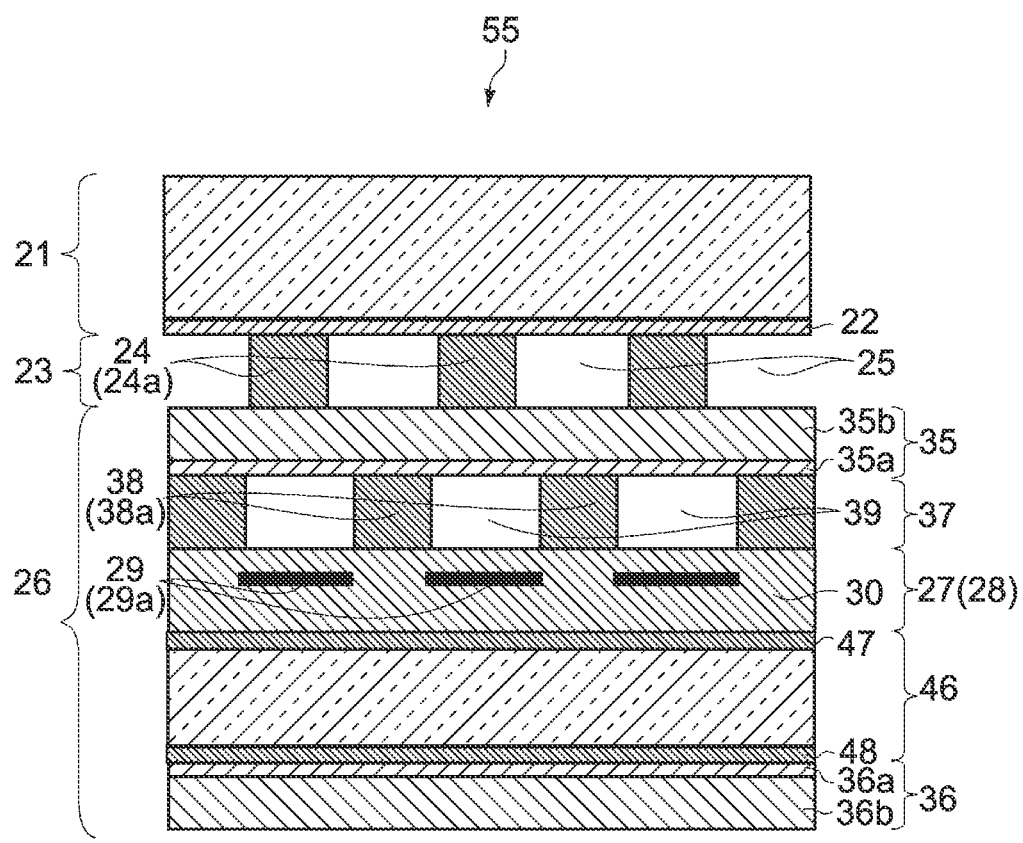
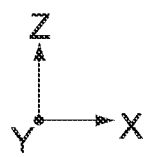
FIG.28

PRESSURE-SENSITIVE SENSOR AND ELECTRONIC APPARATUS

CROSS REFERENCE TO RELATED APPLICATIONS

This application is a U.S. National Phase of International Patent Application No. PCT/JP2019/046602 filed on Nov. 28, 2019, which claims priority benefit of Japanese Patent Application No. JP 2018-240191 filed in the Japan Patent Office on Dec. 21, 2018. Each of the above-referenced applications is hereby incorporated herein by reference in its entirety.

TECHNICAL FIELD

The present technology relates to a technology such as a pressure-sensitive sensor that detects pressure.

BACKGROUND ART

For example, Patent Literature 1 indicated below discloses a capacitive pressure-sensitive sensor. The sensor includes a sensor electrode section that includes a pulse electrode and a sense electrode, two reference electrode layers that are situated across the sensor electrode section from each other, and a deformable layer that is arranged between the sensor electrode section and the reference electrode layer.

When pressure is applied to a sensing surface of the sensor, the deformable layer is deformed, and the sensor electrode section and the reference electrode layer get close to each other. At this point, a portion of electric lines of force that are provided between the pulse electrode and the sense electrode of the sensor electrode section flows into the reference electrode layer, and this results in a change in capacitance. The pressure applied to the pressure-sensitive sensor is detected on the basis of the change in capacitance.

Further, the technology disclosed in Patent Literature 1 further includes another deformable layer that is made of, for example, plastic foam and arranged between the sensing surface of the sensor and an internal surface of an exterior body, in order to, for example, absorb variations (tolerances) in the dimensions of, for example, the exterior body and a frame.

CITATION LIST

Patent Literature

Patent Literature 1: WO2018/151268

DISCLOSURE OF INVENTION

Technical Problem

There is a possibility that the technology disclosed in Patent Literature 1 will not be able to sufficiently ensure tolerances such as various tolerances in component and variations caused when the sensor is mounted.

In view of the circumstances described above, it is an object of the present technology to provide a technology such as a pressure-sensitive sensor that can sufficiently ensure tolerances.

Solution to Problem

A pressure-sensitive sensor according to the present technology includes a sensor section, a clearance layer, and a push-in layer.

The sensor section includes a sensor electrode layer, a first reference electrode layer, and a first deformable layer that is situated between the sensor electrode layer and the first reference electrode layer.

The clearance layer is situated outside of the sensor section to face the first reference electrode layer.

The push-in layer is situated between the first reference electrode layer and the clearance layer, and pushes the first reference electrode layer toward the sensor electrode layer in response to an external force to deform the first deformable layer.

This results in sufficiently ensuring tolerances.

In the pressure-sensitive sensor described above, the push-in layer may include a first patterning structure that is situated between the first reference electrode layer and the clearance layer.

In the pressure-sensitive sensor described above, the first patterning structure may include a plurality of first pillar portions arranged in a direction horizontal to the layers.

In the pressure-sensitive sensor described above, the first deformable layer may include a second patterning structure that is situated between the sensor electrode layer and the first reference electrode layer.

In the pressure-sensitive sensor described above, the second patterning structure may include a plurality of second pillar portions arranged in the direction horizontal to the layers.

In the pressure-sensitive sensor described above, the first deformable layer may include a hollow portion in which there is not the second pillar portion of the plurality of second pillar portions, and each of the plurality of first pillar portions may be arranged at a position that corresponds to the hollow portion in a stacking direction vertical to the layers.

In the pressure-sensitive sensor described above, the sensor electrode layer may include a sensing portion, and each of the plurality of first pillar portions may be arranged at a position that corresponds to the sensing portion in a stacking direction vertical to the layers.

In the pressure-sensitive sensor described above, the clearance layer may include plastic foam.

In the pressure-sensitive sensor described above, the push-in layer may be made of a material harder than a material of the clearance layer.

In the pressure-sensitive sensor described above, the sensor section may further include a second reference electrode layer that is arranged such that the sensor electrode layer is situated between the first reference electrode layer and the second reference electrode layer.

In the pressure-sensitive sensor described above, the sensor section may further include a second deformable layer that is situated between the sensor electrode layer and the second reference electrode layer.

In the pressure-sensitive sensor described above, the first deformable layer and the second deformable layer may be different from each other in at least one of structure or material.

In the pressure-sensitive sensor described above, one of the first deformable layer and the second deformable layer may include a patterning structure.

In the pressure-sensitive sensor described above, the patterning structure may include a plurality of pillar portions arranged in a direction horizontal to the layers.

In the pressure-sensitive sensor described above, another of the first deformable layer and the second deformable layer may include plastic foam.

An electronic apparatus according to the present technology includes an exterior body and a pressure-sensitive sensor that detects an external force applied through the exterior body.

The pressure-sensitive sensor includes a sensor section, a clearance layer, and a push-in layer.

The sensor section includes a sensor electrode layer, a first reference electrode layer, and a first deformable layer that is situated between the sensor electrode layer and the first reference electrode layer.

The clearance layer is situated outside of the sensor section to face the first reference electrode layer.

The push-in layer is situated between the first reference electrode layer and the clearance layer, and pushes the first reference electrode layer toward the sensor electrode layer in response to the external force to deform the first deformable layer.

BRIEF DESCRIPTION OF DRAWINGS

FIG. 18 illustrates various examples and various comparative examples.

FIG. 27 illustrates various examples and various comparative examples in the second embodiment.

FIG. 28 is a side view schematically illustrating a pressure-sensitive sensor according to a third embodiment.

MODE(S) FOR CARRYING OUT THE INVENTION

Embodiments according to the present technology will now be described below with reference to the drawings.

First Embodiment

<Overall Configuration of Smartphone and Configuration of Each Structural Element>

Figure 1:
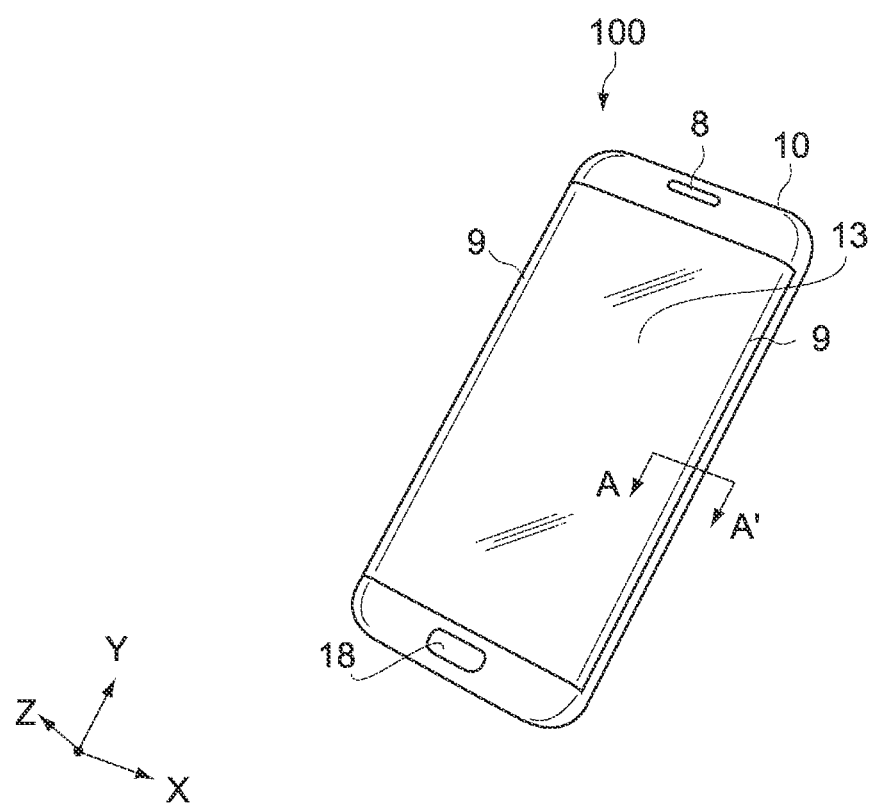
FIG. 1 is a perspective view illustrating a smartphone according to an embodiment of the present technology.

FIG. 1 is a perspective view illustrating a smartphone 100 according to an embodiment of the present technology. The smartphone 100 is described herein as an example of an electronic apparatus that includes a pressure-sensitive sensor 20.

As illustrated in FIG. 1, the smartphone 100 according to the present embodiment includes a housing 10 (an exterior body) and a display section 13 that is provided on a front surface of the housing 10.

The housing 10 is sized such that a user can hold the housing 10 with one hand. The housing 10 has a shape of a plate that is thin in a thickness direction (a Z-axis direction), short in a width direction (an X-axis direction), and long in a length direction (a Y-axis direction).

The housing 10 includes a rounded edge that is formed on the front surface of the housing 10 and connected to a side surface situated on each of two sides of the housing 10 in the width direction (the X-axis direction). The rounded portion is hereinafter referred to as a round portion 9.

The display section 13 is provided on the front surface of the housing 10, and an earpiece 8 is provided at a position higher than the display section 13 on the front surface of the housing 10. Further, a push-button operation section 18 is provided at a position lower than the display section 13 on the front surface of the housing 10. Note that a mouthpiece, a connector, and the like are also provided to the housing 10, although illustrations thereof are omitted.

The housing 10 is made of, for example, any type of metal such as stainless steel, or any type of resin such as polycarbonate (a portion of the housing 10 that does not correspond to the display section 13).

The display section 13 extends in the length direction (the Y-axis direction) such that a portion of the front surface of the housing 10 remains uncovered with the display section 13, and also extends in the width direction (the X-axis direction) to reach the round portion 9.

Figure 2:
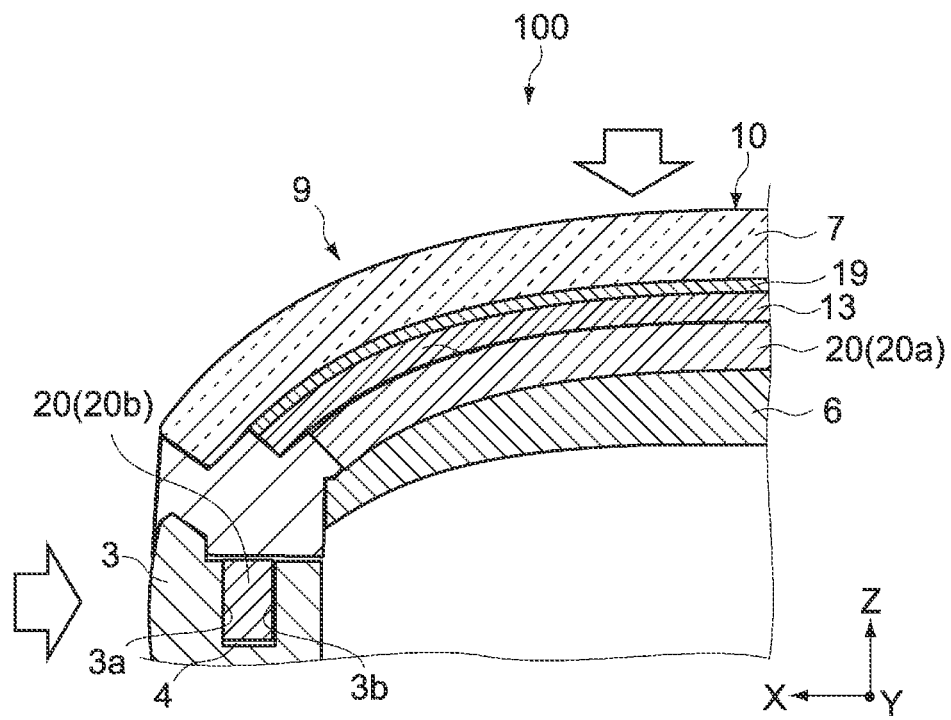
FIG. 2 is a schematic cross-sectional view along the line A-A' of FIG. 1.
Figure 3:
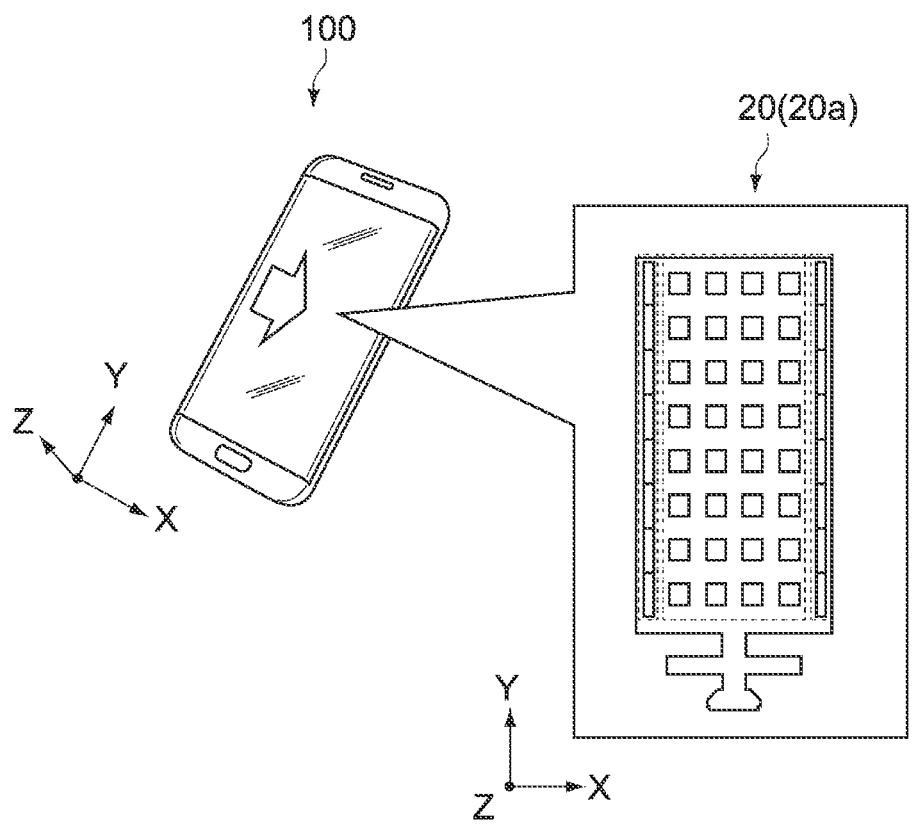
FIG. 3 illustrates a first pressure-sensitive sensor that is included in the smartphone.
Figure 4:
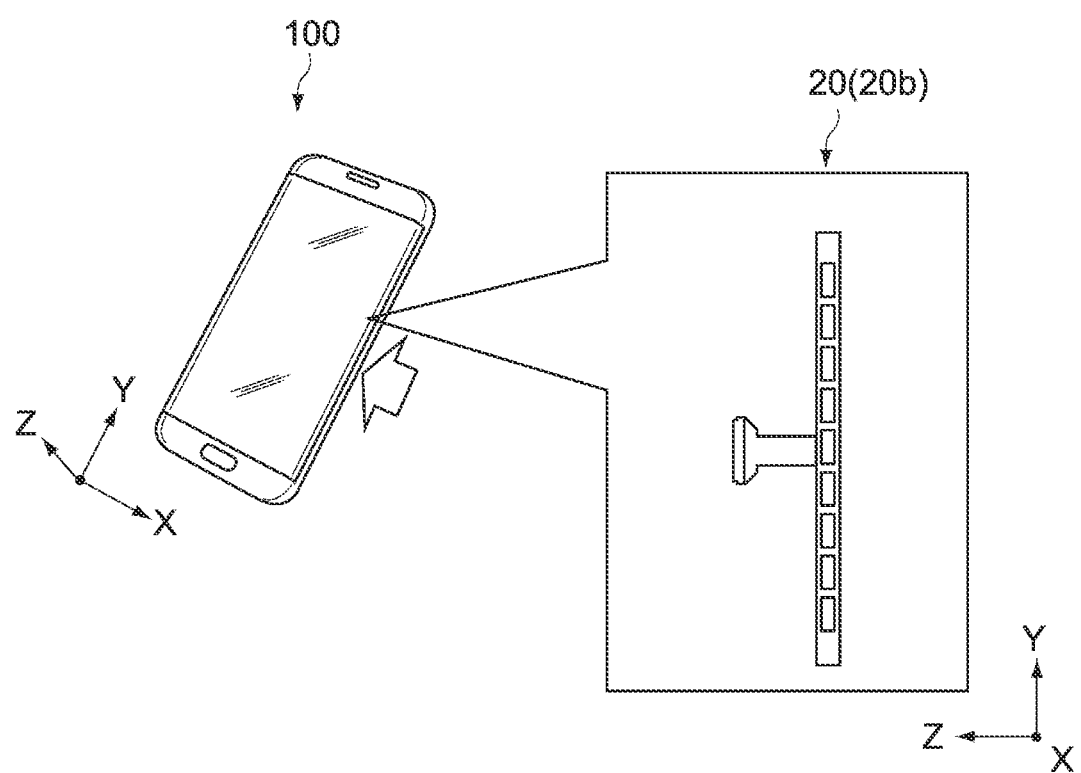
FIG. 4 illustrates a second pressure-sensitive sensor that is included in the smartphone.

FIG. 2 is a schematic cross-sectional view along the line A-A' of FIG. 1. Further, FIG. 3 illustrates a first pressure-sensitive sensor 20a that is included in the smartphone 100, and FIG. 4 illustrates a second pressure-sensitive sensor 20b that is included in the smartphone 100.

As illustrated in FIG. 2, the smartphone 100 includes a frame 6, the first pressure-sensitive sensor 20a, the display section 13, a proximity sensor 19, and a cover member 7 on the front surface of the housing 10 in order from below (from the inside of the housing 10) in the thickness direction (the Z-axis direction). Further, the smartphone 100 includes the second pressure-sensitive sensor 20b on the side surface situated on each of the two sides of the housing 10 in the width direction (the X-axis direction).

Note that, in the description herein, the two pressure-sensitive sensors 20 are each simply referred to as a "pressure-sensitive sensor 20" when they are not to be distinguished, and the two pressure-sensitive sensors 20 are referred to as the "first pressure-sensitive sensor 20a" and the "second pressure-sensitive sensor 20b" when they are particularly to be distinguished.

The frame 6, the first pressure-sensitive sensor 20a, the display section 13, the proximity sensor 19, and the cover member 7 are each formed into a layer, and are arranged to be stacked in order from below in the thickness direction (a stacking direction: the Z-axis direction).

The frame 6, the first pressure-sensitive sensor 20a, the display section 13, the proximity sensor 19, and the cover member 7 each have a rectangular shape as viewed from the front, and have a similar area (with respect to the shape of the first pressure-sensitive sensor 20a in a plan view, refer to FIG. 3). Further, the frame 6, the first pressure-sensitive sensor 20a, the display section 13, the proximity sensor 19, and the cover member 7 each include two rounded ends in the width direction. In other words, these members each extend in the width direction to reach the round portion 9.

The frame 6 supports the first pressure-sensitive sensor 20a from below. The frame 6 is made of, for example, any type of metal such as stainless steel, or any type of resin such as polycarbonate. Note that, for example, any type of circuit board on which a central processing unit (CPU) and the like are mounted is arranged further inward than the frame 6 in the housing 10.

The first pressure-sensitive sensor 20a is arranged on the front surface of the housing 10 between the frame 6 and the display section 13 in the thickness direction (the Z-axis direction). The first pressure-sensitive sensor 20a detects pressure applied through the cover member 7, the proximity sensor 19, and display section 13 when an external force is applied to the surface of the cover member 7 (the exterior body) by a user. The configuration of the first pressure-sensitive sensor 20a will be described in detail later with reference to, for example, FIGS. 6 to 8.

The display section 13 includes, for example, a liquid crystal display or an electroluminescence (EL) display.

The proximity sensor 19 detects the proximity of the finger of a user, a stylus, or the like to the display section 13, and the position thereof. For example, a capacitive or resistive sensor is used as the proximity sensor 19, but any type of sensor may be used as the proximity sensor 19.

For example, when a user touches the cover member 7 with his/her finger, the proximity sensor 19 detects the touch of the finger and the position of the touch. On the other hand, the first pressure-sensitive sensor 20a detects pressure when pushing is further performed with the finger touching the cover member 7.

The cover member 7 is a member that forms a portion of the housing 10 above the display section 13 on the front surface of the housing 10. The cover member 7 is made of, for example, a glass material, and light from the display section 13 can be transmitted through the cover member 7. Further, the cover member 7 can protect, for example, the proximity sensor 19 and the display section 13 from an external impact.

The second pressure-sensitive sensor 20b is provided on each of the right and left side surfaces of the housing 10. Note that the second pressure-sensitive sensor 20b may be provided only on one of the right and left side surfaces.

The second pressure-sensitive sensor 20b has a shape long in the length direction (the Y-axis direction), and has the same length as, or a length slightly shorter than the side surface in the width direction of the housing 10 (the X-axis direction) (refer to FIG. 4).

In the length direction (the Y-axis direction), grooves 4 used to accommodate the second pressure-sensitive sensor 20b are respectively formed in sidewall members 3 that respectively form the right side surface and the left side surface in the width direction of the housing 10. The sidewall member 3 includes two wall surfaces 3a and 3b that are parallel to each other and formed by the groove 4.

The second pressure-sensitive sensor 20b is accommodated in the groove 4 to be situated between the two wall surfaces 3a and 3b formed by the groove 4. The second pressure-sensitive sensor 20b detects pressure applied through the sidewall member 3 when an external force is applied to the surface of the sidewall member 3 (the exterior body) by a user.

Figure 5:
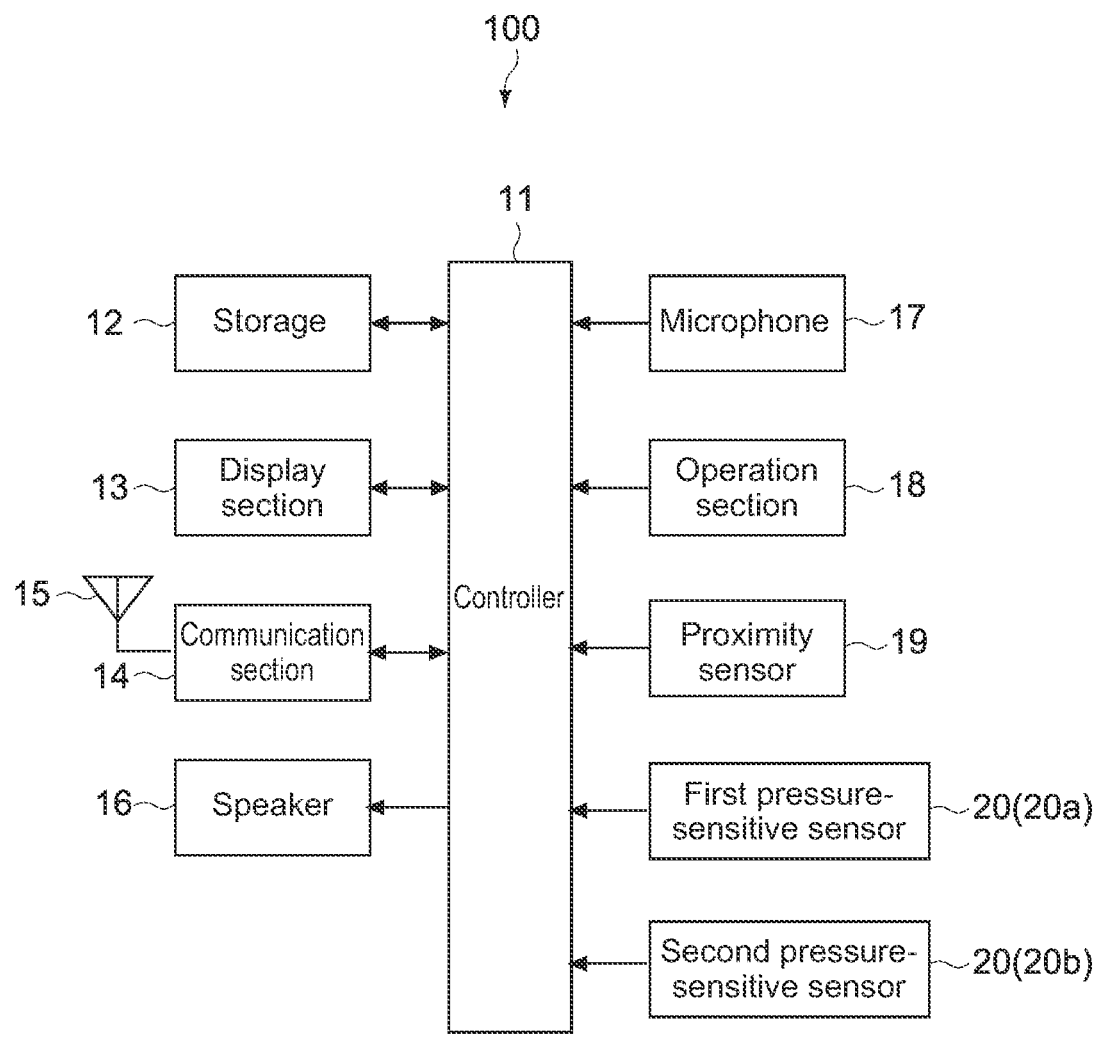
FIG. 5 is a block diagram illustrating an electrical configuration of the smartphone.

FIG. 5 is a block diagram illustrating an electrical configuration of the smartphone 100. As illustrated in FIG. 5, the smartphone 100 includes a controller 11, a storage 12, the display section 13, a communication section 14, an antenna 15, a speaker 16, a microphone 17, the operation section 18, the proximity sensor 19, the first pressure-sensitive sensor 20a, and the second pressure-sensitive sensor 20b.

The controller 11 includes, for example, a CPU. The controller 11 performs various computations on the basis of various programs stored in the storage 12, and performs an overall control on the respective structural elements of the smartphone 100.

The storage 12 includes a volatile memory used as a working region for the controller 11, and a nonvolatile memory that stores therein various programs necessary for processing performed by the controller 11. The various programs described above may be read from a portable recording medium such as an optical disk or a semiconductor memory, or may be downloaded from a server apparatus in a network.

The display section 13 displays thereon various images under the control of the controller 11. The communication section 14 converts the frequency of radio waves transmitted and received by the antenna 15, and performs processing such as modulation and demodulation. The antenna 15 transmits and receives radio waves used for a telephone call and radio waves used for a packet communication for, for example, an e-mail and web data.

The speaker 16 includes, for example, a digital-to-analog converter and an amplifier. The speaker 16 performs digital-to-analog conversion processing and amplification processing with respect to sound data for a telephone call that is input by the controller 11, and outputs sound through the earpiece 8.

The microphone 17 includes, for example, an analog-to-digital converter. The microphone 17 converts, into digital sound data, analog sound data input by a user through the mouthpiece, and outputs the digital sound data to the controller 11. The digital sound data output to the controller 11 is encoded and then transmitted through the communication section 14 and the antenna 15.

The push-button operation section 18 detects an operation performed by a user, and outputs the detected operation to the controller 11. The proximity sensor 19 detects the proximity of, for example, the finger of the user and the position thereof, and outputs the detected information to the controller 11. Further, the first pressure-sensitive sensor 20a and the second pressure-sensitive sensor 20b detect an external pressure applied by the finger of the user or a position pressed with the finger of the user, and outputs the detected information to the controller 11.

<Pressure-Sensitive Sensor>

[First Pressure-Sensitive Sensor]

Figure 6:
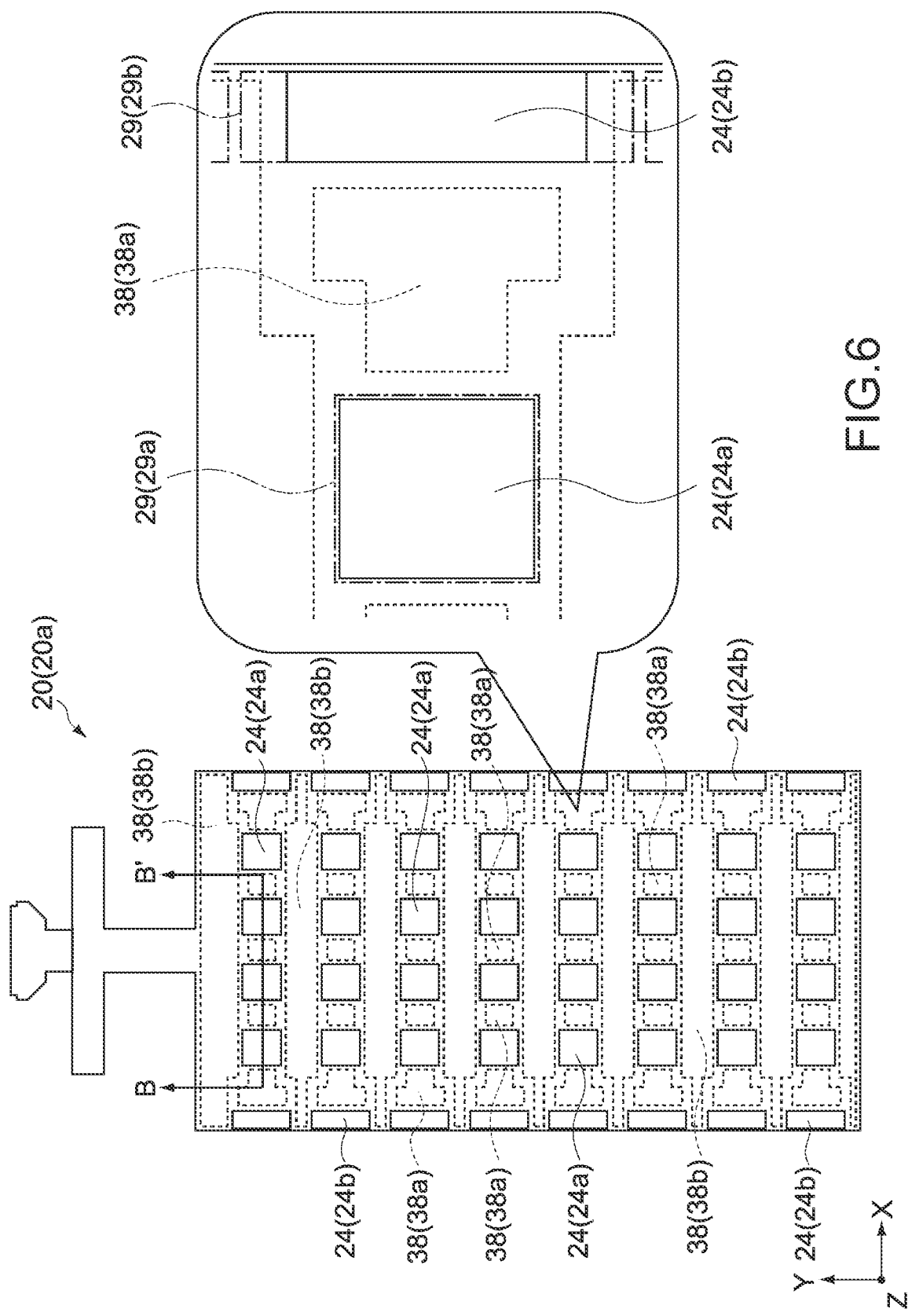
FIG. 6 is a plan view schematically illustrating a first pressure-sensitive sensor.
Figure 7:
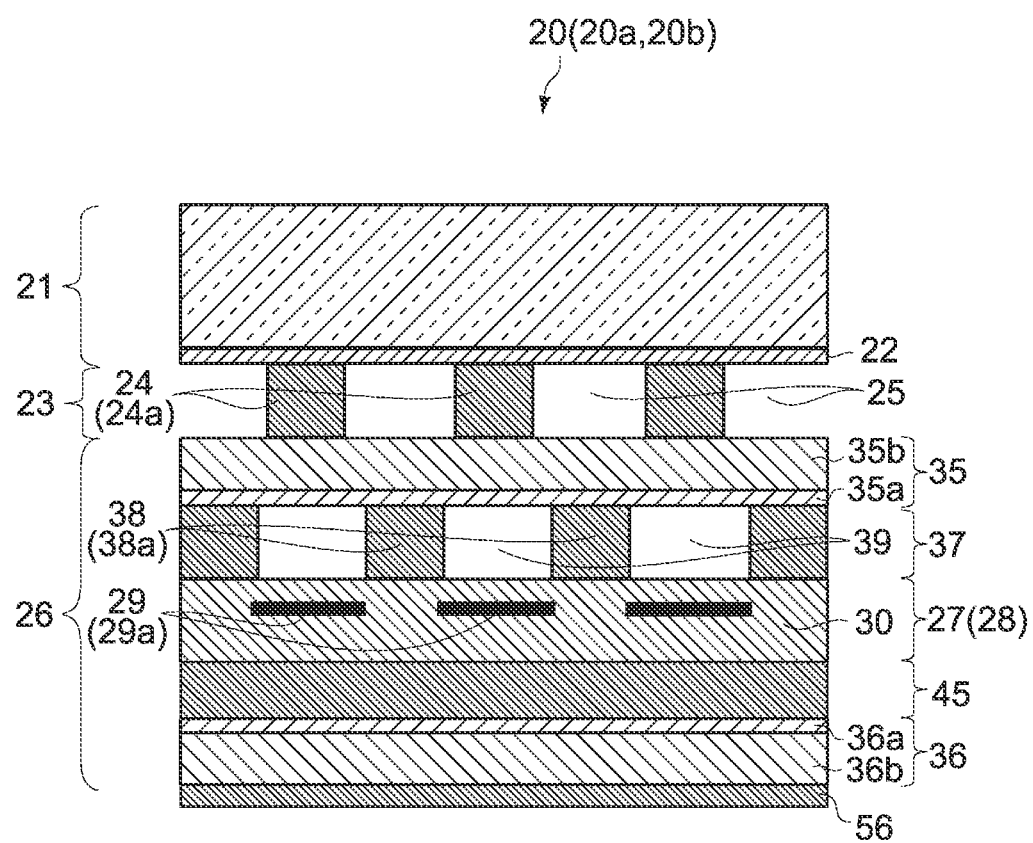
FIG. 7 is a cross-sectional view along the line B-B' of FIG. 6, and is a side view schematically illustrating the first pressure-sensitive sensor.

Next, an example of a configuration of the pressure-sensitive sensor 20 is described in detail using a specific example. FIG. 6 is a plan view schematically illustrating the first pressure-sensitive sensor 20a. Note that, in FIG. 6, an illustration of a clearance layer 21 included in the first pressure-sensitive sensor 20a is omitted. FIG. 7 is a cross-sectional view along the line B-B' of FIG. 6, and is a side view schematically illustrating the first pressure-sensitive sensor 20a.

As illustrated in FIGS. 6 and 7, the first pressure-sensitive sensor 20a includes the clearance layer 21, a push-in layer 23, and a sensor section 26 in order from above (from the outside) in a stacking direction (the Z-axis direction).

The sensor section 26 includes a first electrode film layer 35, a deformable layer 37 (a first deformable layer 37), a sensor electrode layer 27, a fixation layer 45, and a second electrode film layer 36 in order from above (from the outside) in the stacking direction (the Z-axis direction).

A bonding layer 56 is provided on a lower surface of the second electrode film layer 36 (a lower surface of a second film layer 36b), and the second electrode film layer 36 is bonded to an upper surface of the frame 6 through the bonding layer 56. On the other hand, an upper surface of the clearance layer 21 is brought into contact with, or is bonded to a lower surface of the display section 13.

Note that the first pressure-sensitive sensor 20a may be placed upside down. In this case, the second electrode film layer 36 is arranged on the side of the lower surface of the display section 13, and the clearance layer 21 is arranged on the side of the upper surface of the frame 6.

(Sensor Electrode Layer)

The sensor electrode layer 27 is included in a portion of a flexible printed circuit board (flexible printed circuit) 28. The sensor electrode layer 27 is flexible, and includes a base material 30 and a sensing portion 29 that is provided to the base material 30. The base material 30 is made of, for example, polymer resin such as polyethylene terephthalate, polycarbonate, or acrylic resin. The sensing portion is made out of, for example, any type of metal film such as a copper thin film, a silver paste film, or a silver thin film.

The sensor electrode layer 27 has a thickness of, for example, between about 30 μm and 150 μm. Note that specific numerical values used for, for example, a dimension indicated herein are merely examples, and can be changed as appropriate.

Figure 8:
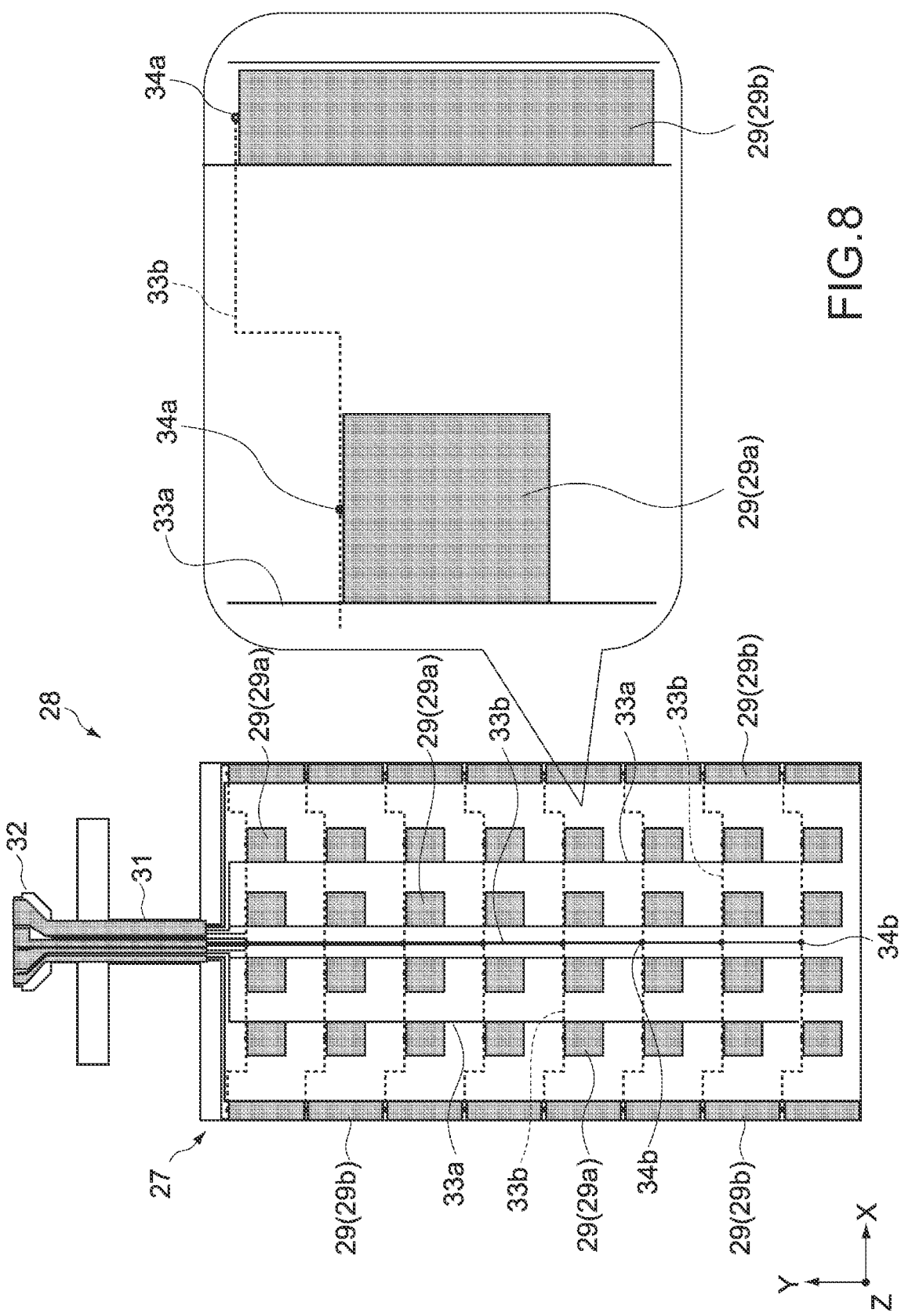
FIG. 8 is a wiring diagram of a flexible printed circuit board in the first pressure-sensitive sensor.

FIG. 8 is a wiring diagram of the flexible printed circuit board (flexible printed circuit) 28 (hereinafter referred to as an FPC board 28) in the first pressure-sensitive sensor 20a. The FPC board 28 includes the sensor electrode layer 27 being rectangular in the plan view and being a main portion of the FPC board 28, a connection portion 31 that extends from the sensor electrode layer 27, and a connection terminal portion 32 that is arranged on an end of the connection portion 31.

The connection portion 31 extends in the length direction (the Y-axis direction) from around the center in the width direction (the X-axis direction) of the sensor electrode layer 27. The connection terminal portion 32 is electrically connected to a substrate on which the controller 11 and the like are mounted.

The sensing portion 29 is a capacitive sensor, and includes a square first sensing portion 29a and a rectangular second sensing portion 29b. In the sensor electrode layer 27 from which two end portions in the width direction (the X-axis direction) have been excluded, the first sensing portions 29a are regularly arranged at specified intervals in the width direction (the X-axis direction) and in the length direction (the Y-axis direction). In the present embodiment, the number of the first sensing portions 29a is 32 in total with eight rows×four columns.

The second sensing portion 29b is a rectangle that is smaller in width and longer in length than the first sensing portion 29a. In the two end portions in the width direction (the X-axis direction) of the sensor electrode layer 27, that is, in a portion corresponding to the round portion 9, the second sensing portions 29b are regularly arranged at specified intervals in the length direction. In the present embodiment, the number of the second sensing portions 29b is 16 in total with eight rows×two columns.

The number of all of the sensing portions 29 is 48 in total with eight rows×six columns (the first sensing portions 29a are arranged in four out of six columns in a center portion, and the second sensing portions 29b are arranged in two out of six columns in two end portions). Note that specific numbers of the respective members described in the present embodiment are merely examples, and can be changed as appropriate.

Each sensing portion 29 includes, for example, a pulse electrode in the form of comb teeth (not illustrated) and a sense electrode in the form of comb teeth (not illustrated). The pulse electrode in the form of comb teeth and the sense electrode in the form of comb teeth are arranged such that the comb teeth of the pulse electrode and the comb teeth of the sense electrode face each other, and such that the comb teeth of one of the pulse electrode and the sense electrode are each placed in a corresponding one of spaces each formed between the comb teeth of another of the pulse electrode and the sense electrode. Note that the type of the sensing portion 29 is not particularly limited, and any type may be adopted.

Further, two wires that are a first wire 33a for sensing electrode and a second wire 33b for pulse electrode are connected to each sensing portion 29. The first wire 33a for sensing electrode is shared for each column, whereas the second wire 33b for pulse electrode is shared for each row.

The first wire 33a for sensing electrode is formed in the length direction (the Y-axis direction) along the sensing portion 29 in each column. The second wire 33b is arranged at the same level as the sensing portion 29 in the thickness direction (the stacking direction: the Z-axis direction).

The second wire 33b for pulse electrode is routed from the sensing portion 29 to the side of a back surface of base material 30 through a through hole 34a (refer to an enlarged view on the right in FIG. 8). The second wire 33b is formed in the width direction (the X-axis direction) along the sensing portion 29 in each row on the back surface of the base material 30. Further, the second wire 33b is formed such that the second wire 33b is back to the same level as the sensing portion 29 through a through hole 34b provided in the center in the width direction of the sensor electrode layer 27, and then is connected to the connection portion 31 in the length direction (the Y-axis direction).

Note that the FPC board 28 is configured such that the first wire 33a and the second wire 33b are arranged at different levels to prevent the first wire 33a and the second wire 33b from being brought into contact with each other.

(Electrode Film Layer)

Now return to the description with reference to FIGS. 6 and 7. The first electrode film layer 35 (a first reference electrode layer 35a) and the second electrode film layer 36 (a second reference electrode layer 36a) are arranged such that the sensor electrode layer 27 is situated between the first electrode film layer 35 and the second electrode film layer 36 in the stacking direction (the Z-direction).

The first electrode film layer 35 is flexible, and includes a first film layer 35b and the first reference electrode layer 35a provided on the side of one of surfaces of the first film layer 35b. The second electrode film layer 36 is also flexible, and includes a second film layer 36b and the second reference electrode layer 36a provided on the side of one of surfaces of the second film layer 36b. The first reference electrode layer 35a and the second reference electrode layer 36a are so-called ground electrodes, and are at the ground potential.

The first electrode film layer 35 and the second electrode film layer 36 each have an area (in an XY direction) that is similar to the area of the sensor electrode layer 27. Further, the first electrode film layer 35 and the second electrode film layer 36 each have a thickness of, for example, between about 10 μm and 100 μm. Furthermore, the first reference electrode layer 35a and the second reference electrode layer 36a each have a thickness of between about 0.05 μm and 0.5 μm.

The first electrode film layer 35 and the second electrode film layer 36 basically have a similar configuration, although the first electrode film layer 35 and the second electrode film layer 36 are oriented inversely with each other in the stacking direction. In other words, in the first electrode film layer 35, the first reference electrode layer 35a is arranged below the first film layer 35b to face the side of the sensor electrode layer 27. On the other hand, in the second electrode film layer 36, the second reference electrode layer 36a is arranged above the second film layer 36b to face the side of the sensor electrode layer 27.

For example, polymer resin such as polyethylene terephthalate, polycarbonate, or acrylic resin is used as a material of the first film layer 35b and the second film layer 36b. Further, for example, an inorganic conductive material, an organic conductive material, or a conductive material containing both the inorganic conductive material and the organic conductive material is used as a material of the first reference electrode layer 35a and the second reference electrode layer 36a.

Examples of the inorganic conductive material include metals such as aluminum, copper, and silver; alloys such as stainless steel; and metal oxides such as zinc oxide and indium oxide. Further, examples of the organic conductive material include carbon materials such as carbon black and a carbon fiber, and conductive polymers such as substituted or unsubstituted polyaniline and polypyrrole. Note that any conductive material may be used as the material.

The first reference electrode layer 35a and the second reference electrode layer 36a are respectively formed on the first film layer 35b and the second film layer 36b by, for example, vapor deposition, sputtering, bonding, or coating. Note that the first film layer 35b and the second film layer 36b may be omitted, and, in this case, the first reference electrode layer 35a and the second reference electrode layer 36a are made out of, for example, a thin plate made of metal such as stainless steel or aluminum; a conductive fiber; or a conductive nonwoven fabric.

(Fixation Layer)

The fixation layer 45 is situated between the sensor electrode layer 27 and the second electrode film layer 36 (the second reference electrode layer 36a). The fixation layer 45 has an area (in the XY direction) that is similar to the area of the sensor electrode layer 27, and, further, the fixation layer 45 has a thickness of, for example, between about 50 μm and 200 μm.

The fixation layer 45 is provided to adjust a distance (a gap) between the sensor electrode layer 27 and the second reference electrode layer 36a in the stacking direction (the Z-direction). When an external force is applied by a user, the fixation layer 45 is hardly deformed, compared to the deformation of the deformable layer 37 due to the external force.

The fixation layer 45 is made out of an adhesive or double-faced tape that includes an insulation layer. Examples of the adhesive include an acrylic adhesive, a silicon adhesive, a urethane adhesive, and an adhesive including a combination of at least two of them.

(Deformable Layer)

The deformable layer 37 is situated between the sensor electrode layer 27 and the first electrode film layer 35 (the first reference electrode layer 35a). The deformable layer 37 has an area (in the XY direction) that is similar to the area of the sensor electrode layer 27, and, further, the deformable layer 37 has a thickness of, for example, between about 30 μm and 300 μm.

The deformable layer 37 is elastically deformable due to an external force applied by a user. When an external force is applied by a user, the first electrode film layer 35 (the first reference electrode) is pushed by the push-in layer 23 toward the sensor electrode layer 27 in response to the external force. When the first electrode film layer 35 is pushed by the push-in layer 23, the deformable layer 37 is elastically deformed, and thus the first reference electrode layer 35a (ground potential) gets closer to the sensing portion 29 in the sensor electrode layer 27. Here, there is a change in the capacitance between the pulse electrode and the sense electrode in the sensing portion 29. Thus, the first pressure-sensitive sensor 20a can detect the change in capacitance in the form of a pressure value.

The deformable layer 37 includes a second patterning structure and a hollow portion 39 in which there is not the second patterning structure. In the present embodiment, the second patterning structure includes a plurality of second pillar portions 38 arranged in a direction (the XY direction) that is horizontal to the respective layers. Further, the hollow portion 39 is a portion in which there is not the second pillar portion 38. Various structures such as a matrix structure, a stripe structure, a mesh structure, a radial structure, a geometric structure, and a spiral structure may be adopted as the second patterning structure. Note that, typically, it is sufficient if the deformable layer 37 is elastically deformable, and the deformable layer 37 does not necessarily have to include a patterning structure including the hollow portion 39.

Each of the plurality of second pillar portions 38 in the deformable layer 37 is arranged at a position that does not correspond to the sensing portion 29 in the sensor electrode layer 27 in the stacking direction (the Z-direction) (a position that corresponds to a hollow portion 25 in the push-in layer 23, in the stacking direction). Conversely, the sensing portion 29 in the sensor electrode layer 27 is arranged at a position at which there is not the second pillar portion 38 in the deformable layer 37, that is, at a position that corresponds to the hollow portion 39 in the deformable layer 37.

The second pillar portion 38 includes a plurality of first supports 38a each having a pillar shape that is short in the width direction (the X-axis direction) and in the length direction (the Y-axis direction). Further, the second pillar portion 38 includes a plurality of second supports 38b each having a pillar shape that is long in the width direction (the X-axis direction) and short in the length direction (the Y-axis direction). Here, in the present embodiment, the second pillar portion 38 has a shape of a substantially quadrangular prism, but the shape of the second pillar portion 38 may be, for example, a cylindrical shape or a shape of a polygonal prism other than a quadrangular prism. The shape of the second pillar portion 38 is not particularly limited.

The first support 38a is arranged at a position that corresponds to a position, in the length direction (the Y-axis direction), at which the sensing portion 29 in the sensor electrode layer 27 is formed, and corresponds to a position, in the width direction (the X-axis direction), at which the sensing portion 29 is not arranged. On the other hand, the second support 38b is arranged at a position that corresponds to a position, in the length direction (the Y-axis direction), at which the sensing portion 29 in the sensor electrode layer 27 is not formed. Note that the first support 38a and the second support 38b are alternately arranged in the length direction.

The first supports 38a are regularly arranged at specified intervals in the width direction (the X-axis direction) and in the length direction (the Y-axis direction). Since the sensing portions 29 are arranged in eight rows, the first supports 38a are arranged in the same eight rows. Since the sensing portions 29 in the sensor electrode layer 27 are arranged in six columns, the number of the first supports 38a included in a single row is five (6−1=5). Note that the number of the first supports 38a is 40 in total with eight rows×five columns.

The second supports 38b are regularly arranged at specified intervals in the length direction (the Y-axis direction). Since the sensing portions 29 are arranged in eight rows, the second supports 38b are arranged in nine rows (8+1=9). Since the second support 38b is long in the width direction (the X-axis direction), the number of the second supports 38b included in a single row is one. Note that the number of the second supports 38b is nine in total with nine rows×one column.

The second pillar portion 38 is made out of, for example, an adhesive or double-faced tape that includes an insulation layer. Examples of the adhesive include an acrylic adhesive, a silicon adhesive, a urethane adhesive, and an adhesive including a combination of at least two of them.

(Clearance Layer)

The clearance layer 21 is arranged outside of the sensor section 26 to face the first electrode film layer 35 (the first reference electrode layer 35a). The clearance layer 21 is stacked on the push-in layer 23 through the bonding layer 22.

The clearance layer 21 has an area (in the XY direction) that is similar to the area of the sensor electrode layer 27, and, further, the clearance layer 21 has a thickness of, for example, between about 200 μm and 800 μm. Note that the clearance layer 21 may be provided only on an upper portion of the first pillar portion 24 in the push-in layer 23 (in this case, the clearance layer 21 also has a pillar shape).

The clearance layer 21 is elastically deformable, and is capable of ensuring tolerances. The clearance layer 21 is situated between the upper surface of the frame 6 and the lower surface of the display section 13 upon assembling the smartphone 100, and thus is elastically deformed to collapse. Accordingly, the clearance layer 21 ensures tolerances (such as variations in a distance between the upper surface of the frame 6 and the display section 13). Note that the ensuring of tolerances will be described in detail later. Further, when an external force is applied by a user, the clearance layer 21 is elastically deformed in response to the external force, and pushes the push-in layer 23 toward the first electrode film layer 35 (the first electrode reference layer).

Examples of a material used for the clearance layer 21 include plastic foam, an insulating elastomer, and a (thin) metallic spring. The plastic foam is a so-called sponge, and examples of the plastic foam include polyurethane foam, polyethylene foam, polyolefin foam, sponge rubber, and a combination of at least two of them. Examples of the insulating elastomer include a silicon elastomer, an acrylic elastomer, a urethane elastomer, a styrene elastomer, and a combination of at least two of them.

(Push-in Layer)

The push-in layer 23 is arranged outside of the sensor section 26, and is situated between the first electrode film layer 35 (the first reference electrode layer 35a) and the clearance layer 21. The push-in layer 23 has an area (in the XY direction) that is similar to the area of the sensor electrode layer 27, and, further, the push-in layer 23 has a thickness of, for example, between about 50 μm and 300 μm.

When an external force is applied by a user, the push-in layer 23 pushes the first electrode film layer 35 (the first reference electrode layer 35a) toward the sensor electrode layer 27 in response to the external force to deform the deformable layer 37.

The push-in layer 23 includes a first patterning structure and the hollow portion 25 in which there is not the first patterning structure. In the present embodiment, the first patterning structure includes a plurality of first pillar portions 24 arranged in the direction (the XY direction) that is horizontal to the respective layers. Further, the hollow portion 25 is a portion in which there is not the first pillar portion 24. Note that various structures such as a matrix structure, a stripe structure, a mesh structure, a radial structure, a geometric structure, and a spiral structure may be adopted as the first patterning structure. Note that the push-in layer 23 does not necessarily have to include a patterning structure including the hollow portion 25.

Each of the plurality of first pillar portions 24 in the push-in layer 23 is arranged at a position that corresponds to the sensing portion 29 in the sensor electrode layer 27 in the stacking direction (the Z-direction). Further, the first pillar portion 24 in the push-in layer 23 is arranged at the position, in the stacking direction, at which there is not the second pillar portion 38 in the deformable layer 37, that is, at the position that corresponds to the hollow portion 39 in the deformable layer 37.

The first pillar portion 24 includes a plurality of first bumps 24a each having a shape of a substantially square prism. Further, the first pillar portion 24 includes a plurality of second bumps 24*b* each having a shape of a substantially quadrangular prism, the shape of a substantially quadrangular prism being short in the width direction (the X-axis direction) and long in the length direction (the Y-axis direction). Here, in the present embodiment, the first pillar portion 24 (the first bump 24*a*, the second bump 24*b*) has a shape of a quadrangular prism, but the shape of the first pillar portion 24 may be, for example, a cylindrical shape or a shape of a polygonal prism other than a quadrangular prism. The shape of the second pillar portion 38 is not particularly limited.

The first bump 24*a* in the push-in layer 23 is provided at a position that corresponds to the first sensing portion 29*a* in the sensor electrode layer 27 in the stacking direction (the Z-direction) (refer to an enlarged view on the right in FIG. 6). Further, the second bump 24*b* in the push-in layer 23 is provided at a position that corresponds to the second sensing portion 29*b* in the sensor electrode layer 27 in the stacking direction (the Z-direction) (refer to the enlarged view on the right in FIG. 6).

Further, the shape (square) of the first bump 24*a* in the push-in layer 23 in the plan view is substantially the same as the shape of the first sensing portion 29*a* in the sensor electrode layer 27 in the plan view. Furthermore, the shape (rectangle) of the second bump 24*b* in the push-in layer 23 in the plan view is substantially the same as the shape of the second sensing portion 29*b* in the sensor electrode layer 27 in the plan view (although the second bump 24*b* is slightly shorter than the second sensing portion 29*b*). Note that, from the viewpoint of sensitivity variations due to sticking variations that are caused in the respective layers, the second bump 24*b* is typically made larger or smaller than the second sensing portion 29*b* by a size corresponding to a sticking deviation.

In the push-in layer 23 from which two end portions in the width direction (the X-axis direction) have been excluded, the first bumps 24*a* are regularly arranged at specified intervals in the width direction and in the length direction. In the present embodiment, the number of the first bumps 24*a* is 32 in total with eight rows×four columns.

The second bump 24*b* is a rectangle that is smaller in width and longer in length than the first bump 24*a* in the plan view. In the two end portions in the width direction (the X-axis direction) of the push-in layer 23, that is, in the portion corresponding to the round portion 9, the second bumps 24*b* are regularly arranged at specified intervals in the length direction. In the present embodiment, the number of the second bumps 24*b* is 16 in total with eight rows×two columns.

The number of all of the first pillar portions 24 (the first bumps 24*a* and the second bumps 24*b*) is 48 in total with eight rows×six columns (the first bumps 24*a* are arranged in four out of six columns in a center portion, and the second bumps 24*b* are arranged in two out of six columns in two end portions).

The first pillar portion 24 is made out of, for example, an adhesive or double-faced tape that includes an insulation layer. Examples of the adhesive include an acrylic adhesive, a silicon adhesive, a urethane adhesive, and an adhesive including a combination of at least two of them. Note that a material harder than a material used for the clearance layer 21 is typically used for a material of the push-in layer 23.

[Second Pressure-Sensitive Sensor]

The second pressure-sensitive sensor 20*b* basically has a configuration similar to the configuration of the first pressure-sensitive sensor 20*a*. In other words, as in the case of the first pressure-sensitive sensor 20*a*, the second pressure-sensitive sensor 20*b* includes the clearance layer 21, the push-in layer 23, and the sensor section 26 in order from the outside in the stacking direction (the Z-axis direction). The sensor section 26 includes the first electrode film layer 35, the deformable layer 37, the sensor electrode layer 27, the fixation layer 45, and the second electrode film layer 36 in order from the outside.

The second pressure-sensitive sensor 20*b* is similar to the first pressure-sensitive sensor 20*a* except that, for example, the pressure-sensitive sensor 20 is situated between different structural elements, the orientation of the pressure-sensitive sensor 20 is different, and the pressure-sensitive sensor 20 has a different shape.

Specifically, the first pressure-sensitive sensor 20*a* is arranged between the upper surface of the frame 6 and the lower surface of the display section 13, whereas the second pressure-sensitive sensor 20*b* is arranged between the two wall surfaces 3*a* and 3*b* that are formed in the sidewall member 3 in the housing 10.

Further, the stacking direction of the first pressure-sensitive sensor 20*a* is the thickness direction (the Z-axis direction) of the housing 10, whereas the stacking direction of the first pressure-sensitive sensor 20*a* is the width direction (the X-axis direction) of the housing 10.

Here, FIG. 3 illustrates the first pressure-sensitive sensor 20*a*, and FIG. 4 illustrates the second pressure-sensitive sensor 20*b*. As can be seen from the comparison of FIGS. 3 and 4, the width (the Z-axis direction) of the second pressure-sensitive sensor 20*b* is smaller than the width (the X-axis direction) of the first pressure-sensitive sensor 20*a*. Thus, in the second pressure-sensitive sensor 20*b*, the sensing portion 29 in the sensor electrode layer 27, the second pillar portion 38 (the support) in the deformable layer 37, the first pillar portion 24 (the bump) in the push-in layer 23, and the like are each arranged in, for example, one row. Further, the second pressure-sensitive sensor 20*b* does not include the round portion 9, which is different from the first pressure-sensitive sensor 20*a*.

<Ensuring of Tolerances>

One of the objects of the present embodiment is to sufficiently ensure tolerances. A concept of ensuring of tolerances is specifically described.

Figure 9:
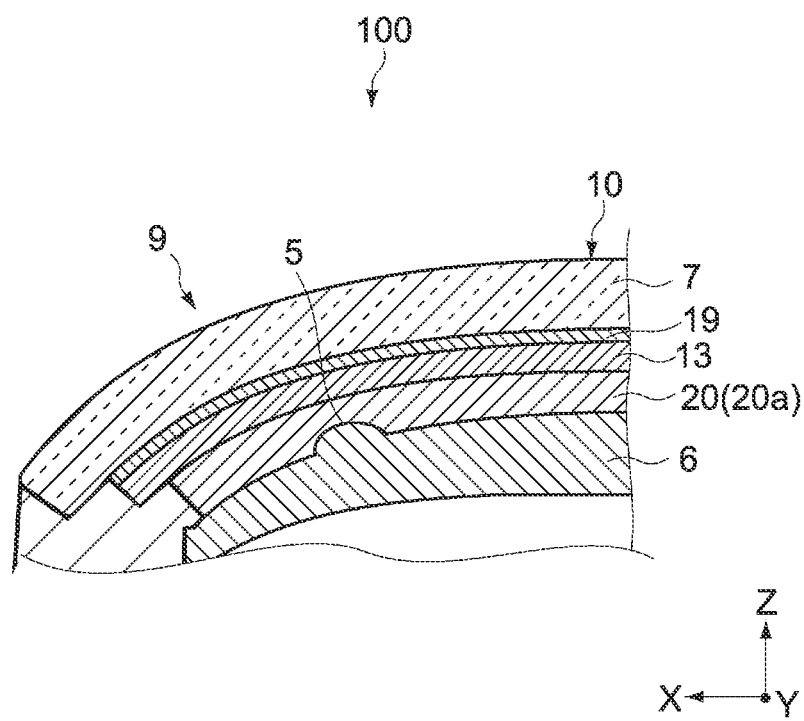
FIG. 9 is a diagram describing ensuring of tolerances, and is a cross-sectional view in an XZ plane of the smartphone.

FIG. 9 is a diagram describing ensuring of tolerances, and is a cross-sectional view in an XZ plane of the smartphone 100. In the example illustrated in FIG. 9, a convex portion 5 is formed in a portion of the upper surface of the frame 6. Note that FIG. 9 illustrates the convex portion 5 displayed in a size larger than its actual size, in order to clearly display the convex portion 5.

As illustrated in FIG. 9, the two surfaces (the upper surface of the frame 6 and the lower surface of the display section 13 in this example) between which the pressure-sensitive sensor 20 is situated, are not perfectly planar, and there are thus tolerances (variations) such as unevenness. Further, even if the two surfaces between which the pressure-sensitive sensor 20 is situated, are perfectly planar without unevenness, such two surfaces will not be perfectly parallel to each other due to, for example, fabrication errors, and there will be tolerances (variations) in a distance between the two surfaces. In particular, such tolerances are likely to occur in the round portion 9.

Further, it is assumed that different electronic apparatuses (for example, different smartphones of the same model, different smartphones of different models, or a smartphone and a tablet PC) each include the identical pressure-sensitive sensor 20. In this case, there are tolerances (variations) for each apparatus in a distance between two surfaces between which the pressure-sensitive sensor 20 is situated.

In the present embodiment, the clearance layer 21 is provided in order to ensure such tolerances. In other words, the clearance layer 21 preferentially collapses due to, for example, unevenness to absorb tolerances when the pressure-sensitive sensor 20 is mounted. This results in ensuring tolerances.

On the other hand, there is a possibility that tolerances will not be sufficiently ensured by simply providing the clearance layer 21 to the pressure-sensitive sensor 20. Thus, in the present embodiment, the push-in layer 23 is provided separately from the clearance layer 21 in the pressure-sensitive sensor 20.

[Ideal Value of Sensor Output]

Figure 10:
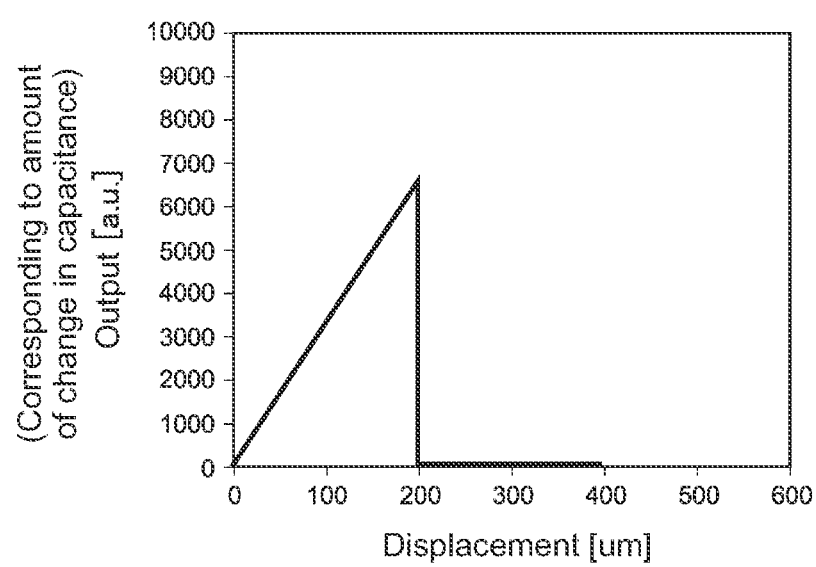
FIG. 10 illustrates an ideal value of sensor output with respect to displacement.
Figure 11:
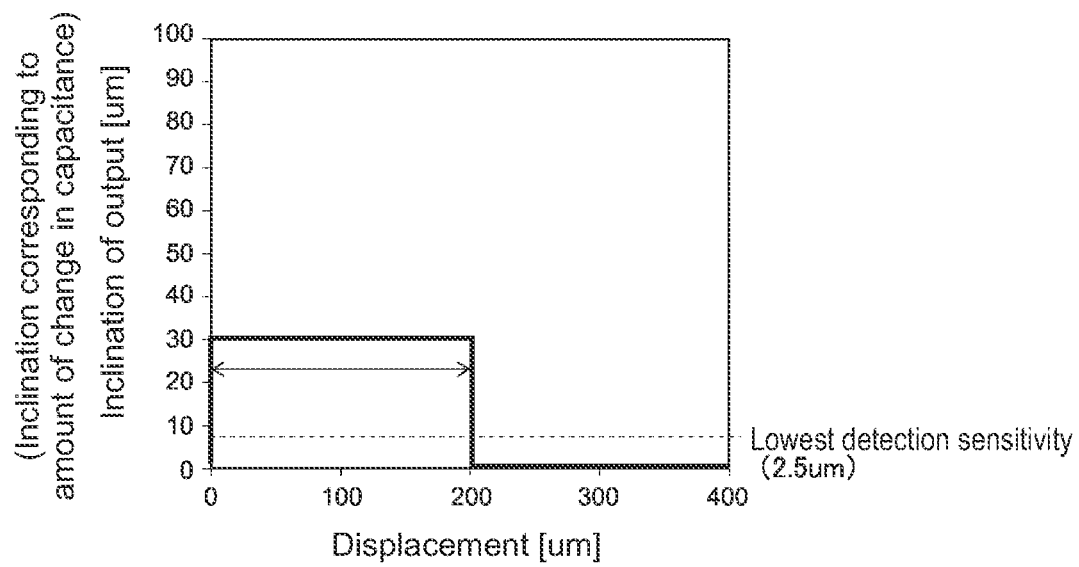
FIG. 11 illustrates an ideal value of an inclination of the value of sensor output with respect to the displacement.

Next, an ideal value of sensor output is described, and a lowest detection sensitivity, an operating load, a range of ensuring of tolerances, and the like are also described. FIG. 10 illustrates an ideal value of sensor output with respect to displacement, and FIG. 11 illustrates an ideal value of an inclination of the value of sensor output with respect to the displacement. Note that waveforms illustrated in FIGS. 10 and 11 each indicate a value of sensor output when the pressure-sensitive sensor is not included in the smartphone 100.

Ideally, the value of sensor output (corresponding to an amount of a change in capacitance) linearly varies with respect to displacement when the housing 10 is deformed in response to an external force, as illustrated in FIG. 10. In this case, the inclination of the value of sensor output is constant with respect to the displacement when the housing 10 is deformed in response to an external force, as illustrated in FIG. 11.

In the examples illustrated in FIGS. 10 and 11, the value of sensor output varies by 30 every 1-μm displacement in a range in which the displacement is between 0 μm and 200 μm. Note that, in a range in which the displacement is 200 μm or more, the upper limit is reached and the value of sensor output is zero.

(Lowest Detection Sensitivity)

First, the lowest detection sensitivity is described. The lowest detection sensitivity indicates a smallest value of displacement of the housing 10 that is to be detected by the controller 11 (for example, an electrostatic integrated circuit (IC)), and a value that is set discretionarily. For example, the lowest detection sensitivity is set to 2.5 μm in order to cause the controller 11 to detect deformation of the housing 10 when the housing 10 is deformed at least 2.5 μm. For example, the lowest detection sensitivity is set to 2.5 μm in order to cause the controller 11 to perform processing, with a 2.5-μm deformation of the housing 10 being used as a trigger when the housing 10 is deformed 2.5 μm. Alternatively, the lowest detection sensitivity is set to a value less than 2.5 μm in consideration of a safety margin.

When the lowest detection sensitivity is 2.5 μm, it is necessary that a 2.5-μm deformation of the housing 10 be detectable by the controller 11 when the housing 10 is deformed 2.5 μm. Thus, it is necessary that, when the housing 10 is deformed 2.5 μm, the value of sensor output vary by a value equal to or greater than a smallest value of sensor output that is detectable by the controller 11.

It is assumed that, in this example, a smallest value of sensor output that is detectable by the controller 11 is 20. In other words, when the value of sensor output varies by 20 or more, the controller 11 can detect it, but when the value of sensor output varies by a value less than 20, the controller 11 does not detect it.

In order to meet the lowest detection sensitivity of 2.5 μm under this condition, it is necessary that the value of sensor output vary by 20 or more when the housing 10 is deformed 2.5 μm. In this case, it is necessary that the value of sensor output vary by eight every 1-μm deformation (displacement) of the housing 10. This is indicated by a dotted line in FIG. 11 (the lowest detection sensitivity is 2.5 μm).

It is possible to meet the lowest detection sensitivity of 2.5 μm when the value of an inclination of a value of sensor output (the vertical axis) is situated above the dotted line in FIG. 11. In other words, in a displacement range of between 0 μm and 200 μm, the value of sensor output exhibits 30 every 1-μm deformation, which is a value sufficiently larger than exhibiting eight every 1-μm deformation, and thus it is possible to sufficiently meet the lowest detection sensitivity of 2.5 μm.

(Operating Load)

Next, the operating load is described. The operating load is a load necessary to operate an application (to cause the controller to perform processing, with a certain threshold being used as a trigger), and an amount of deformation of the housing is proportional to this operating load. For example, it is assumed that there are the smartphone 100 in which an inclination of a value of sensor output exhibits 30 every 1 μm, as illustrated in FIG. 11, and the smartphone 100 in which an inclination of a value of sensor output exhibits 60 every 1 μm, and a threshold used to operate an application is set to 30. In this case, an application of the former smartphone 100 operates with a 1-μm deformation, and the application of the latter smartphone 100 operates with a 0.5-μm displacement. The amount of deformation of the housing is proportional to the operating load. Thus, consequently, a twofold operating load is necessary for the former smartphone 100, compared to the latter smartphone 100. In other words, the value of the operating load is a value inversely proportional to the value (the vertical axis) of the inclination of a value of sensor output in FIG. 11.

Here, an external force (a load) necessary to deform the housing 10 is assumed to be constant regardless of displacement. In this case, it is sufficient if a user pushes the housing 10 1 μm with the same external force with respect to any displacement in a displacement range of between 0 μm and 200 μm in the case of an ideal pressure-sensitive sensor 20 illustrated in FIGS. 10 and 11, in order for the user to change the value of sensor output by, for example, 30. In other words, in the case of an ideal pressure-sensitive sensor 20, the user feels the same operating load with respect to any displacement in a displacement range of between 0 μm and 200 μm.

If the operating load is too different for each displacement, the user will feel uncomfortable. For example, when the operating load at a displacement point of 150 μm is four times larger than the operating load at a displacement point of 100 μm, the user experiences a fourfold difference in operating load in order to obtain the same variation in value of sensor output.

Thus, a ratio of a largest value Max of an operating load to a smallest value Min of the operating load is defined. Here, it is assumed that a largest value Max of an operating load/a smallest value Min of the operating load ≤2. In other words, the largest value Max of an operating load is a value equal to or less than two times the smallest value Min of the operating load. Note that the value "2" in the formula of Max/Min≤2 can be set discretionarily to the extent that a user does not feel uncomfortable with the operating load (for example, Max/Min≤1.5 or Max/Min≤2.5).

Note that the smallest value Min of an operating load is a value corresponding to a value largest among values of the inclination of the value of sensor output (the vertical axis) in FIG. 11 (since the operating load is inversely proportional to the value of the inclination of the value of sensor output). Further, the largest value Max of an operating load is a value corresponding to a value half the value largest among the values of the inclination of the value of sensor output (the vertical axis). Note that, in FIG. 11, there is a linear relationship between displacement and a value of sensor output in a displacement range of between 0 μm and 200 μm, and thus Max/Min=1. In this case, Max/Min≤2 is satisfied in the displacement range of between 0 μm and 200 μm.

(Range of Ensuring of Tolerances)

Next, the range of ensuring of tolerances is described. The range of ensuring of tolerances is a range (a region) of displacement in which tolerances can be ensured. The range of ensuring of tolerances is defined on the basis of a ratio of a largest value Max of an operating load to a smallest value Min of the operating load, and is a range of displacement in which Max/Min≤2 is satisfied in this example.

In the example illustrated in FIG. 11, the range of ensuring of tolerances is a displacement range of between 0 μm and 200 μm since Max/Min≤2 is satisfied in the displacement range of between 0 μm and 200 μm (refer to an arrow). The range of ensuring of tolerances is favorably wider, and the range of ensuring of tolerances is, for example, equal to or greater than 125 μm. Note that the value of the range of ensuring of tolerances can be set discretionarily.

Note that there is a trade-off relationship between the condition of Max/Min≤2 for an operating load (the value "2") and the condition of a range of ensuring of tolerances. In other words, when the condition for an operating load is made stricter to change from Max/Min≤2 to, for example, Max/Min≤1.5, the condition of a range of ensuring of tolerances is relaxed to exhibit a value greater than 125 μm, such as 100 μm. Conversely, when the condition for an operating load is relaxed to change from Max/Min≤2 to, for example, Max/Min≤2.5, the condition of a range of ensuring of tolerances is made stricter to exhibit a value less than 125 μm, such as 150 μm.

Note that, here, the description is made in terms of what value the condition of a range of ensuring of tolerances exhibits when the condition for an operating load is fixed to Max/Min≤2 under the condition that a lowest detection sensitivity of 2.5 μm is minimally satisfied.

Comparative Examples

Figure 12:
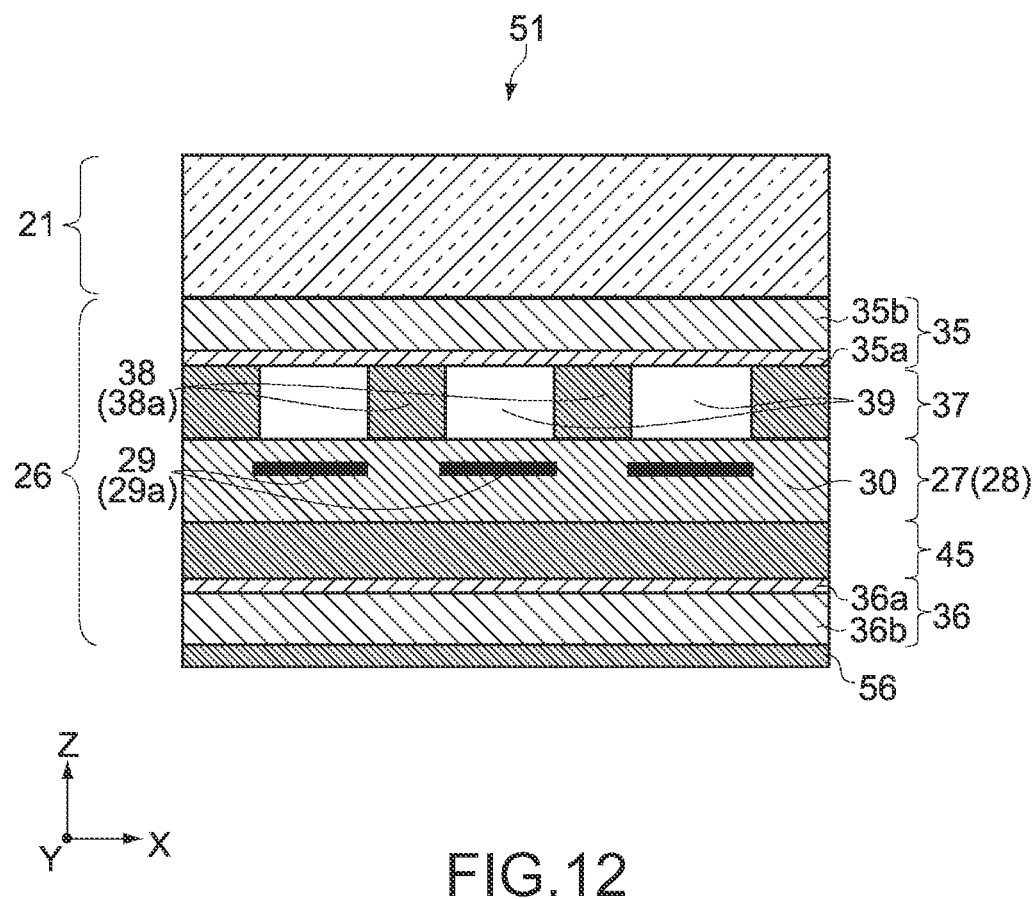
FIG. 12 is a side view schematically illustrating a pressure-sensitive sensor according to a comparative example.

Next, a pressure-sensitive sensor 51 according to a comparative example is described. FIG. 12 is a side view schematically illustrating the pressure-sensitive sensor 51 according to the comparative example. The pressure-sensitive sensor 51 according to the comparative example is different from the pressure-sensitive sensor 20 according to a first embodiment of the present technology in not including the push-in layer 23. Regarding the other points, the pressure-sensitive sensor 51 is similar to the pressure-sensitive sensor 20 according to the first embodiment.

Figure 13:
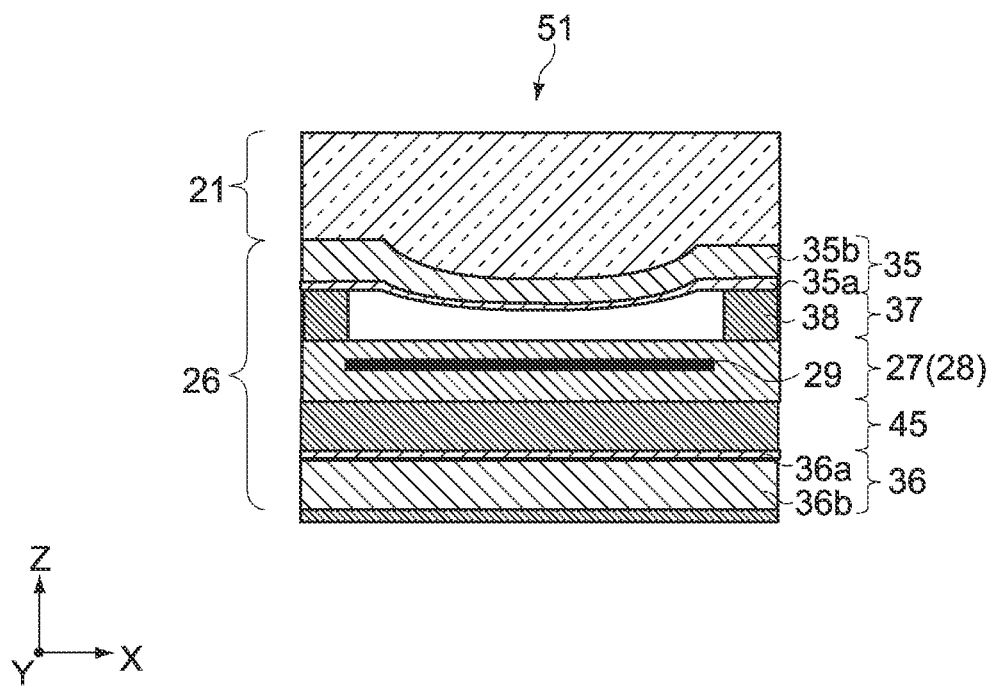
FIG. 13 illustrates a state in which an external force is applied to the pressure-sensitive sensor according to the comparative example.
Figure 14:
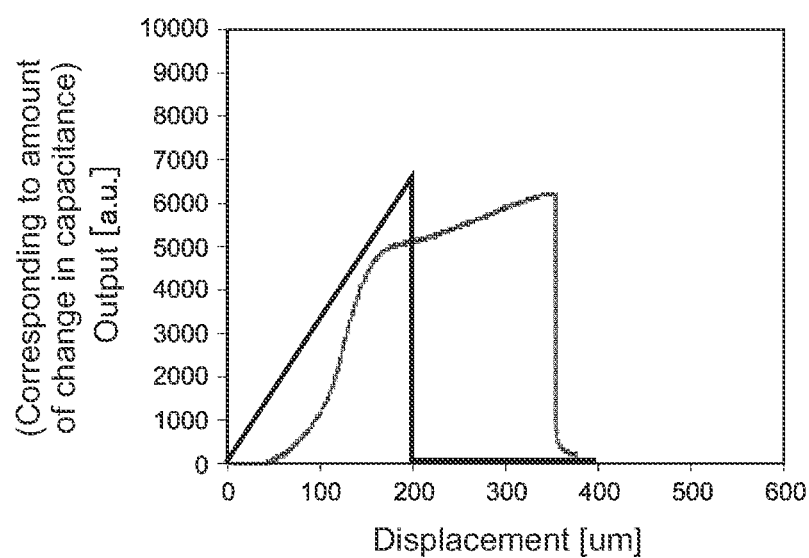
FIG. 14 illustrates a waveform of a value of sensor output with respect to displacement in the pressure-sensitive sensor according to the comparative example.
Figure 15:
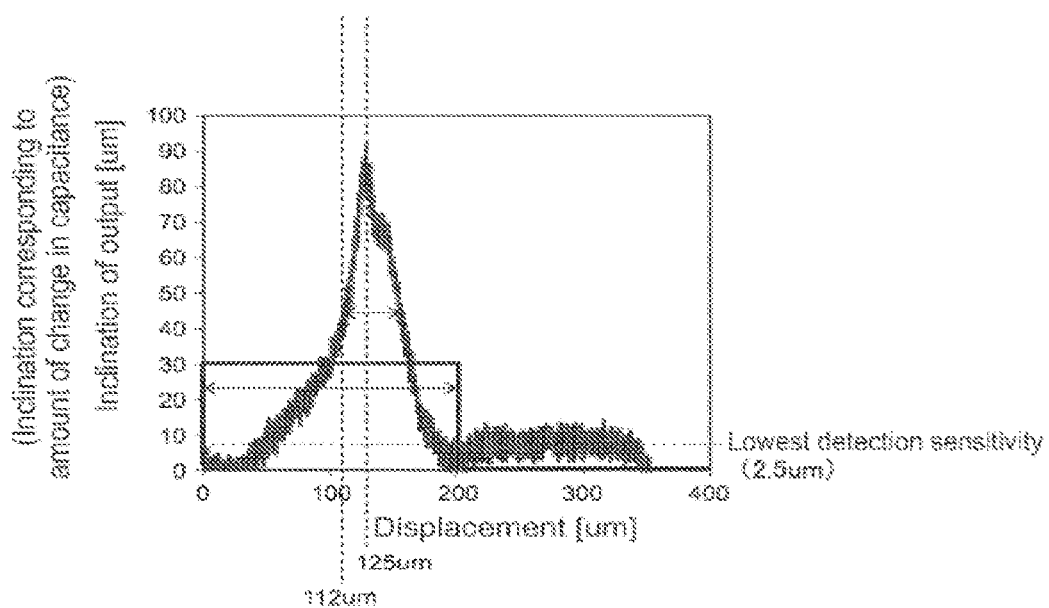
FIG. 15 illustrates a waveform of an inclination of the value of sensor output with respect to the displacement in the pressure-sensitive sensor according to the comparative example.

FIG. 13 illustrates a state in which an external force is applied to the pressure-sensitive sensor 51 according to the comparative example. FIG. 14 illustrates a waveform of a value of sensor output with respect to displacement in the pressure-sensitive sensor 51 according to the comparative example. FIG. 15 illustrates a waveform of an inclination of the value of sensor output with respect to the displacement in the pressure-sensitive sensor 51 according to the comparative example.

Note that the waveforms illustrated in FIGS. 14 and 15 each indicate a waveform when the pressure-sensitive sensor 51 according to the comparative example is not included in an electronic apparatus such as the smartphone 100. Further, FIGS. 14 and 15 also each illustrate an ideal value of sensor output in order to perform comparison.

In the case of the pressure-sensitive sensor 51 according to the comparative example, the value of sensor output does not linearly vary with respect to displacement, as illustrated in FIG. 14. Further, in the case of the pressure-sensitive sensor 51 according to the comparative example, the value of the inclination of the value of sensor output with respect to the displacement is not constant, and varies in the form of a mountain with a peak, as illustrated in FIG. 15.

The waveform of an inclination of a value of sensor output is specifically described. First, when an external force is applied to the pressure-sensitive sensor 51 according to the comparative example, the clearance layer 21 absorbs the external force to collapse, and the clearance layer 21 starts gradually pushing the first electrode film layer 35 (the first reference electrode layer 35a) toward the sensor electrode layer 27. This results in a change in capacitance, and the value of the inclination of a value of sensor output starts being gradually increased around a displacement point of 30 μm.

Thereafter, when the external force is continuously applied, the clearance layer 21 continuously pushes the first electrode film layer 35 (the first reference electrode layer 35a) toward the sensor electrode layer 27. Here, the value of the inclination of a value of sensor output is sharply increased to be largest around a displacement point of 125 μm. Thereafter, the value of the inclination of a value of sensor output is sharply decreased. Then, the value of the inclination of a value of sensor output starts being constant around a point of 180 μm to be approximately zero around a displacement point of 360 μm.

In the comparative example, the lowest detection sensitivity of 2.5 μm is satisfied in a displacement range of between 50 μm and 190 μm, as illustrated in FIG. 15. Further, with respect to the operating load, the condition of "a largest value Max of an operating load/a smallest value Min of the operating load ≤2" is satisfied in a displacement range of between 112 μm and 152 μm (refer to an arrow). Thus, the range of ensuring of tolerances is 40 μm (=152−112) in the comparative example.

Note that displacement that corresponds to a smallest value Min of an operating load is at a displacement point of 125 μm at which the inclination of a value of sensor output exhibits a largest value (90/μm). Further, displacement that corresponds to a largest value Max of the operating load is at displacement points of 112 μm and 152 μm at which the inclination of a value of sensor output exhibits a value half the largest value (45/μm).

Here, for example, it is assumed that the pressure-sensitive sensor 51 according to the comparative example in a state of being collapsed 125 μm in the stacking direction is included in a certain smartphone 100. The inclination of a value of sensor output exhibits a largest value at a displacement point of 125 μm, and the value of sensor output varies by 90 when the housing 10 is pushed 1 μm by a user. Further, it is assumed that the pressure-sensitive sensor 51 according to the comparative example in a state of being collapsed 112 μm in the stacking direction is included in another smartphone 100. The inclination of a value of sensor output exhibits a value half the largest value at a displacement point of 112 μm, and the value of sensor output varies by 45 when the housing 10 is pushed 1 μm by the user.

It is assumed that processing is performed by the controller 11 using the variation of 90 in the value of sensor output as a trigger. In this case, processing is performed by the controller 11 in the certain smartphone 100 when the housing 10 is pushed 1 μm by the user, whereas processing is not performed by the controller 11 in the other smartphone 100 until the housing 10 is pushed 2 μm by the user. In other words, when there is a twofold difference in a value of an inclination of a value of sensor output, the user experiences a twofold operating load.

As described above, in the comparative example, the range of ensuring of tolerances is 40 μm, which does not satisfy a range of ensuring of tolerances that is equal to or greater than 125 μm under the condition of Max/Min≤2. When the clearance layer 21 is directly stacked on the first electrode film layer 35 as in the comparative example, it is difficult to broaden the range of ensuring of tolerances. In particular, when the deformable layer 37 includes a patterning structure including the hollow portion 39, it is even more difficult to broaden the range of ensuring of tolerances. In other words, in the comparative example, there is a trade-off relationship between ensuring of tolerances such as various tolerances in component and variations caused when a pressure-sensitive sensor is mounted, and a sensor sensitivity, and this may result in not sufficiently ensuring tolerances. Further, there may be a reduction in the performance of an electronic apparatus that includes a pressure-sensitive sensor due to practical issues such as separating the strength of a pressure sensitivity into several levels, and a prevention of variations in a set force.

Note that the inventors have discussed by trial and error what structure is to be applied to the pressure-sensitive sensor 51 of the comparative example in order to broaden the range of ensuring of tolerances. Consequently, an experimental result shows that the range of ensuring of tolerances can be broadened by arranging the push-in layer 23 between the clearance layer 21 and the first electrode film layer 35 (the first reference electrode layer 35a), as in the present embodiment.

[Range of Ensuring of Tolerances in First Embodiment]

Figure 16:
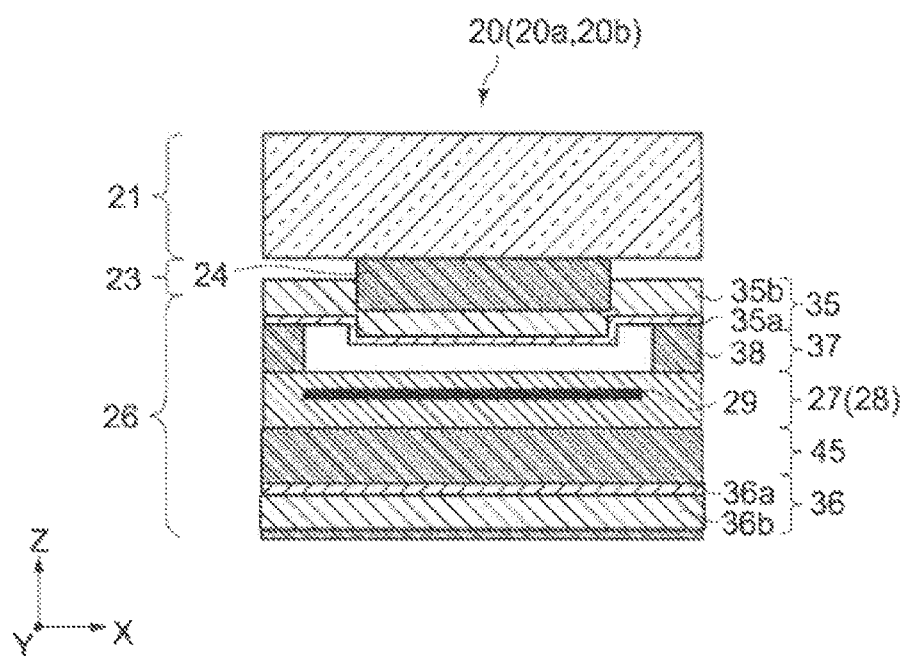
FIG. 16 illustrates a state in which an external force is applied to a pressure-sensitive sensor according to a first embodiment.
Figure 17:
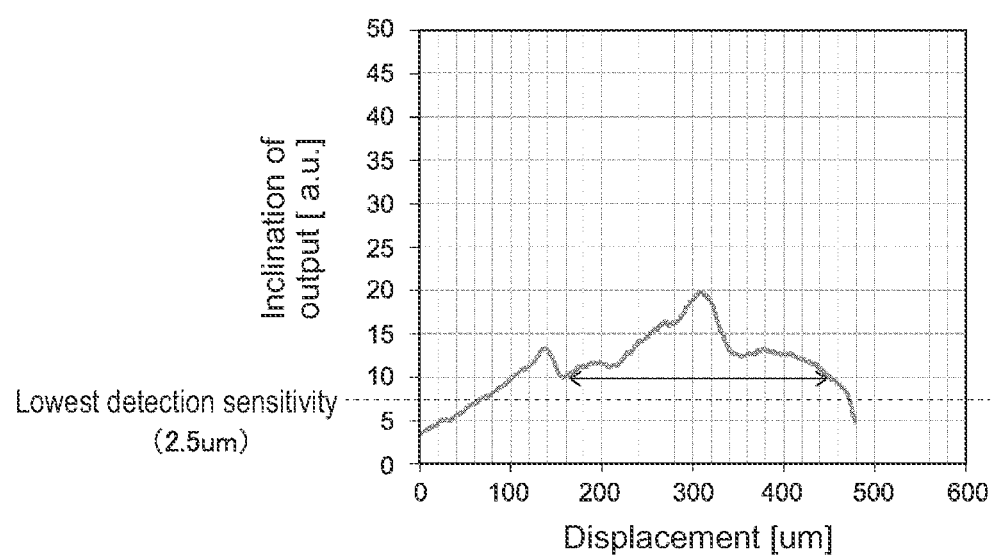
FIG. 17 illustrates a waveform of an inclination of a value of sensor output with respect to displacement in the pressure-sensitive sensor according to the first embodiment.

Next, the range of ensuring of tolerances and the like of the pressure-sensitive sensor 20 according to the first embodiment of the present technology are described. FIG. 16 illustrates a state in which an external force is applied to the pressure-sensitive sensor 20 according to the first embodiment. FIG. 17 illustrates a waveform of an inclination of a value of sensor output with respect to displacement in the pressure-sensitive sensor 20 according to the first embodiment. Note that the waveform of an inclination of a value of sensor output illustrated in FIG. 17 indicates a value of sensor output when the pressure-sensitive sensor 20 is not included in an electronic apparatus such as the smartphone 100.

An operation when an external force is applied to the pressure-sensitive sensor 51 according to the comparative example, and an operation when an external force is applied to the pressure-sensitive sensor 20 according to the present embodiment are compared with each other with reference to FIGS. 13 and 16.

When an external force is applied to the pressure-sensitive sensor 51 according to the comparative example, the clearance layer 21 pushes the first electrode film layer 35 (the first reference electrode layer 35a) toward the deformable layer 37 to deform the deformable layer 37, as illustrated in FIG. 13. In other words, in the comparative example, the clearance layer 21 plays two roles that are a role of ensuring tolerances and a role of pushing the first electrode film layer 35 (the first reference electrode layer 35a) when an external force is applied.

On the other hand, when an external force is applied to the pressure-sensitive sensor 20 according to the present embodiment, not the clearing layer 21 but the push-in layer 23 pushes the first electrode film layer 35 (the first reference electrode layer 35a) toward the deformable layer 37 to deform the deformable layer 37, as illustrated in FIG. 16. In other words, in the first embodiment, the clearance layer 21 plays a role of ensuring tolerances, whereas the push-in layer 23 plays a role of pushing the first electrode film layer 35 (the first reference electrode layer 35a) when an external force is applied. In other words, the two roles are respectively played by the clearance layer 21 and the push-in layer 23 in the pressure-sensitive sensor 20 according to the first embodiment.

As described above, the two roles are respectively played by the clearance layer 21 and the push-in layer 23. Thus, the present embodiment makes it possible to broaden the range of ensuring of tolerances (see an arrow), as illustrated in FIG. 17.

Specifically, in the pressure-sensitive sensor 20 according to the present embodiment, the value of the inclination of a value of sensor output with respect to displacement varies in the form of a mountain with a peak, as illustrated in FIG. 17, but is closer to being constant than that of the comparative example (refer to FIG. 15). In other words, the pressure-sensitive sensor 20 according to the present embodiment provides a near-ideal state in which a value of sensor output equally varies with respect to any displacement (refer to FIG. 11). Note that an illustration of a waveform of a value of sensor output (not the waveform of the inclination thereof) is omitted with respect to the pressure-sensitive sensor 20 according to the present embodiment. However, it is understood, from FIG. 17, that a near-ideal waveform of the value of sensor output is also obtained (refer to FIG. 10), that is, the waveform of the value of sensor output is close to being linear.

The waveform of the inclination of a value of sensor output is specifically described. First, when an external force is applied to the pressure-sensitive sensor 20 according to the present embodiment, the clearance layer 21 absorbs the external force to collapse, and the push-in layer 23 pushes the first electrode film layer 35 (the first reference electrode layer 35a) toward the sensor electrode layer 27. This results in a change in capacitance, and the value of the inclination of a value of sensor output starts being gradually increased.

Thereafter, when the external force is continuously applied, the clearance layer 21 continuously absorbs the external force to collapse, and the push-in layer 23 continuously pushes the first electrode film layer 35 (the first reference electrode layer 35a) toward the sensor electrode layer 27. Here, the value of the inclination of a value of sensor output is gradually increased to be largest around a displacement point of 310 μm. Thereafter, the value of the inclination of a value of sensor output is gradually decreased to be approximately zero around a displacement point of 480 μm.

In other words, in the present embodiment, the push-in layer 23 (separated from the clearance layer 21) pushes the first electrode film layer 35 toward the sensor electrode at substantially regular intervals in response to displacement caused due to an external force. This results in a near-ideal waveform of an inclination of a value of sensor output.

In the present embodiment, the lowest detection sensitivity of 2.5 μm is satisfied in a displacement range of between 70 μm and 470 μm, as illustrated in FIG. 17. Further, with respect to the operating load, the condition of "a largest value Max of an operating load/a smallest value Min of the operating load ≤2" is satisfied in a displacement range of between 160 μm and 450 μm (refer to an arrow). Thus, the range of ensuring of tolerances is 290 μm (=450−160) in the comparative example.

Note that displacement that corresponds to a smallest value Min of an operating load is at a displacement point of 310 μm at which the inclination of a value of sensor output exhibits a largest value (20/μm). Further, displacement that corresponds to a largest value Max of the operating load is at displacement points of 160 μm and 450 μm at which the inclination of a value of sensor output exhibits a value half the largest value (10/μm).

As described above, in the present embodiment, the range of ensuring of tolerances is 290 μm, which sufficiently satisfies the condition of a range of ensuring of tolerances that is equal to or greater than 125 μm under the condition of Max/Min≤2.

Various Examples and Various Comparative Examples

Next, various examples and various comparative examples are described. FIG. 18 illustrates various examples and various comparative examples.

In a first example, PORON "SS-24P" of Rogers Inoac Corporation (registered trademark) was used as a material of the clearance layer 21. "SS-24P" is a sponge material. "SS-24P" having a thickness of 300 μm was used.

Further, in the first example, "Neo Fix" of Nichiei Kako Co., Ltd. (registered trademark) was used as a material of the first pillar portion 24 (the first bump 24a and the second bump 24b) in the push-in layer 23. Neo Fix is a double-faced tape obtained by placing a base film between adhesive layers. Neo Fix having a thickness of 200 μm was used.

"SF-PC5900-C" of TATSUTA Electric Wire and Cable Co., Ltd. was used as a material of the first electrode film layer 35 and the second electrode film layer 36. SF-PC5900-C is obtained by stacking a thin metallic film made of copper or silver (the first reference electrode layer 35a, the second reference electrode layer 36a) on a base film (the first film layer 35b, the second film layer 36b). "SF-PC5900-C" having a thickness of 67 μm was used.

"Neo Fix" of Nichiei Kako Co., Ltd. (registered trademark) was used as a material of the second pillar portion (the first support 38a and the second support 38b) in the deformable layer 37, as in the case of the push-in layer 23. Neo Fix having a thickness of 200 μm was used.

In the first example, the sensitivity (signal-to-noise ratio: SNR) at the time of deformation of 5 μm was 13. Further, in the first example, the range of ensuring of tolerances was 270 μm.

A second example is different from the first example in that the clearance layer 21 has a thickness of 500 μm instead of having a thickness of 300 μm. Regarding the other points, the second example is similar to the first example. In the second example, the sensitivity at the time of deformation of 5 μm was 20, and the range of ensuring of tolerances was 150 μm.

A third example is different from the first example in that the push-in layer 23 has a thickness of 100 μm instead of having a thickness of 200 μm. Regarding the other points, the third example is similar to the first example. In the third example, the sensitivity at the time of deformation of 5 μm was 30, and the range of ensuring of tolerances was 140 μm.

A fourth example is different from the first example in that the deformable layer 37 has a thickness of 100 μm instead of having a thickness of 200 μm. Regarding the other points, the fourth example is similar to the first example. In the fourth example, the sensitivity at the time of deformation of 5 μm was 40, and the range of ensuring of tolerances was 140 μm.

A fifth example is different from the first example in that the material of the electrode film layers 35 and 36 is "METALITE" of Nakai Industrial CO., Ltd. (registered trademark) instead of "SF-PC5900-C". METALITE is obtained by stacking a thin metallic film made of aluminum (the first reference electrode layer 35a, the second reference electrode layer 36a) on a base film (the first film layer 35b, the second film layer 36b). METALITE having a thickness of 50 μm was used. Regarding the other points, the fifth example is similar to the first example. In the fifth example, the sensitivity at the time of deformation of 5 μm was 20, and the range of ensuring of tolerances was 230 μm.

A sixth example is different from the first example in that the clearance layer 21 has a thickness of 500 μm instead of having a thickness of 300 μm. Further, the sixth example is different from the first example in that the material of the electrode film layers is "METALITE" instead of "SF-PC5900-C". METALITE having a thickness of 50 μm was used. Regarding the other points, the sixth example is similar to the first example. In the sixth example, the sensitivity at the time of deformation of 5 μm was 10, and the range of ensuring of tolerances was 290 μm. Note that the waveform of an inclination of a value of sensor output illustrated in FIG. 17 indicates an inclination of a value of sensor output of the pressure-sensitive sensor 20 in the sixth example.

A first comparative example is different from the first example in that the push-in layer 23 is omitted. Regarding the other points, the first comparative example is similar to the first example. In the first comparative example, the sensitivity at the time of deformation of 5 μm was 60, and the range of ensuring of tolerances was 100 μm.

A second comparative example is different from the first example in that the clearance layer 21 is omitted. Regarding the other points, the second comparative example is similar to the first example. In the first comparative example, the sensitivity at the time of deformation of 5 μm was 60, and the range of ensuring of tolerances was 90 μm.

<Example of Using Pressure Detected by Pressure-Sensitive Sensor 20>

Figure 19:
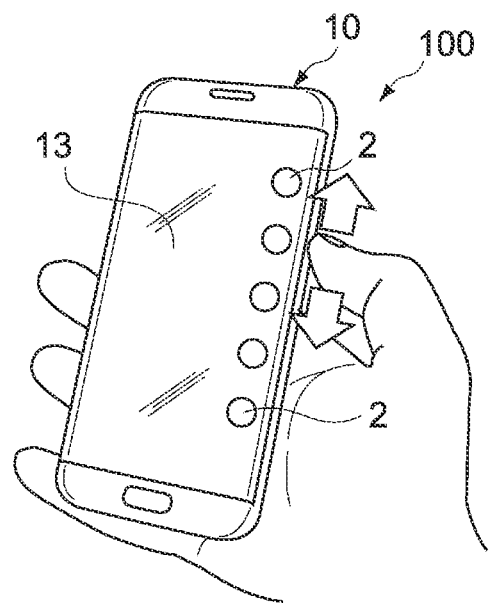
FIG. 19 illustrates a use example of how to perform processing using pressure detected by the pressure-sensitive sensor.
Figure 20:
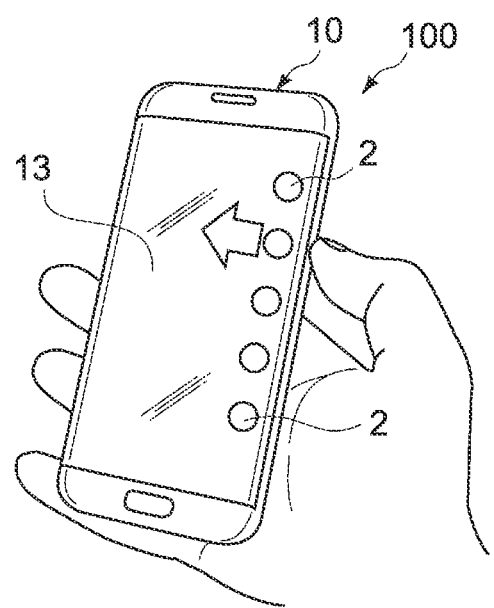
FIG. 20 illustrates a use example of how to perform processing using pressure detected by the pressure-sensitive sensor.

Next, use examples of how processing is performed in the smartphone 100 using pressure detected by the pressure-sensitive sensor 20 are described. FIGS. 19 and 20 illustrate use examples of how to perform processing using pressure detected by the pressure-sensitive sensor 20. Note that FIGS. 19 and 20 illustrate examples of using pressure detected by the second pressure-sensitive sensor 20b arranged on the side surface of the housing 10.

Referring to FIG. 19, first, the controller 11 controls display of the display section 13 such that a plurality of icons 2 is longitudinally displayed at regular intervals in a right end portion of a screen of the display section 13. When a user performs a flick operation up and down with his/her thumb with respect to the right side surface of the housing 10, the flick operation is detected by the controller 11 using pressure detected by the second pressure-sensitive sensor 20b.

When the controller 11 detects the flick operation, the controller 11 controls the display of the display section 13 such that the icon 2 moves in a direction in which the flick operation has been performed (upwardly or downwardly). For example, when the controller 11 detects an upward flick operation, the controller 11 controls the display such that the respective icons 2 are moved upwardly, an uppermost icon 2 lies offscreen, and a new icon 2 lies onscreen in a lower portion of the screen. Further, when the controller 11 detects a downward flick operation, the controller 11 controls the display such that the respective icons 2 are moved downwardly, a lowermost icon 2 lies offscreen, and a new icon 2 lies onscreen in an upper portion of the screen.

Next, refer to FIG. 20. When the user performs a push operation with his/her thumb with respect to the right side surface of the housing 10, the controller 11 detects the push operation using pressure detected by the second pressure-sensitive sensor 20b. When the controller 11 detects the push operation, the controller 11 performs processing of launching an application that corresponds to the icon 2 displayed at a position at which the push operation has been performed.

Consequently, the user can easily select an arbitrary application by performing a flick operation and a push operation with respect to the right side surface of the housing 10.

Next, an example of using pressure detected by the first pressure-sensitive sensor 20a provided on the front surface of the housing 10 is described. In this case, when the user performs a push operation with respect to the screen, the push operation is detected by the controller 11 using pressure detected by the first pressure-sensitive sensor 20a. When the controller 11 detects the push operation, the controller 11 controls the display of the display section 13 such that a menu is displayed at a position, on the screen, at which the detection has been performed.

When the user performs a push operation with a greater force with respect to the screen, the push operation performed with the greater force is detected by the controller 11 using pressure detected by the first pressure-sensitive sensor 20a. In this case, the controller 11 launches an application that corresponds to an item listed in the menu.

The examples of using pressure described above are merely examples, and pressure can be used in various applications. For example, pressure can be used to turn on/off the power, to control volume, to activate a camera, and to detect how the housing 10 is held by the user, but the use of pressure is not limited thereto. Note that, in the respective embodiments according to the present technology, it is possible to easily separate pressure into several levels (for example, a push operation, and a push operation with a greater force) to perform various processes for each level of pressure since the range of ensuring of tolerances is wide.

Effects and Others

As described above, the pressure-sensitive sensor 20 according to the present embodiment includes the push-in layer 23 situated between the first electrode film layer 35 (the first reference electrode layer 35a) and the clearance layer 21. Further, the push-in layer 23 pushes the first electrode film layer 35 (the first reference electrode layer 35a) toward the sensor electrode layer 27 in response to an external force to deform the deformable layer 37.

Such a configuration enables the clearance layer 21 to play a role of ensuring tolerances, and also enables the push-in layer 23 to play a role of pushing the first electrode film layer 35 (the first reference electrode layer 35a) in response to an external force being applied to deform the deformable layer 37.

Accordingly, the present embodiment enables the push-in layer 23 (separated from the clearance layer 21) to push the first electrode film layer 35 (the first reference electrode layer 35a) toward the sensor electrode at substantially regular intervals in response to displacement caused due to an external force. Accordingly, a near-ideal waveform of a value of sensor output can be obtained (a waveform of a value of sensor output can be close to being linear), and a near-ideal waveform of a value of an inclination of the value of sensor output can also be obtained (a waveform of an inclination of the value of sensor output can also be close to being linear). Consequently, the present embodiment makes it possible to broaden the range of ensuring of tolerances, and to properly ensure tolerances due to various causes.

Further, in the present embodiment, the push-in layer 23 includes the first patterning structure including a plurality of first pillar portions 24 (the first bump 24a and the second bump 24b) arranged in the direction horizontal to the layers. This makes it possible to concentrate, on the first pillar portion 24, an external force applied through the clearance layer 21, and thus enables the push-in layer 23 to properly push the first electrode film layer 35 (the first reference electrode layer 35a) toward the sensor electrode layer 27.

Furthermore, in the present embodiment, the deformable layer 37 includes the second patterning structure including a plurality of second pillar portions 38 (the first support 38a and the second support 38b) arranged in the direction horizontal to the layers. This makes it possible to properly deform the deformable layer 37 in response to the pushing performed by the push-in layer 23.

Moreover, in the present embodiment, the first pillar portion 24 (the first bump 24a and the second bump 24b) in the push-in layer 23 is arranged at the position that corresponds to the hollow portion 39 in the deformable layer 37 in the stacking direction vertical to the layers. This enables the push-in layer 23 to more properly push the first electrode film layer 35 (the first reference electrode layer 35a) toward the sensor electrode layer 27.

Further, in the present embodiment, the first pillar portion 24 (the first bump 24a and the second bump 24b) in the push-in layer 23 is arranged at the position that corresponds to the sensing portion 29 in the sensor electrode layer 27 in the stacking direction vertical to the layers. This makes it possible to improve the sensitivity of the pressure-sensitive sensor 20.

Furthermore, the clearance layer 21 includes plastic foam, and this enables the clearance layer 21 to more properly ensure tolerances. Moreover, in the present embodiment, the push-in layer 23 is made of a material harder than a material of the clearance layer 21. This enables the clearance layer 21 to appropriately play a role of ensuring tolerances, and also enables the push-in layer 23 to appropriately play a role of pushing the first electrode film layer 35 (the first reference electrode layer 35a) in response to an external force being applied.

<Pressure-Sensitive Sensor>

Second Embodiment

Figure 21:
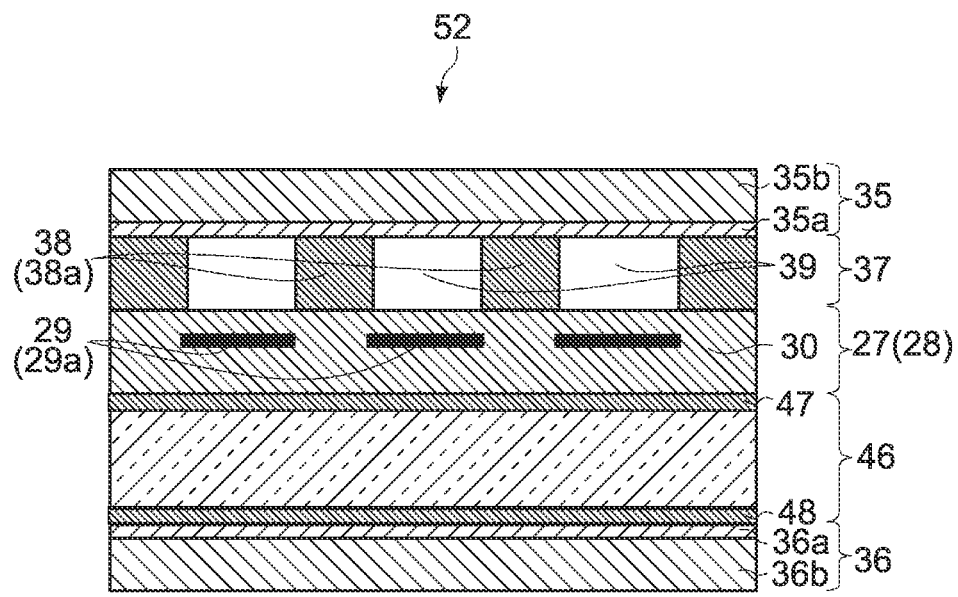
FIG. 21 is a side view schematically illustrating a pressure-sensitive sensor according to a second embodiment.

Next, a second embodiment of the present technology is described. FIG. 21 is a side view schematically illustrating a pressure-sensitive sensor 52 according to the second embodiment.

The clearance layer 21 and the push-in layer 23 that are included in the pressure-sensitive sensor 20 according to the first embodiment are not included in the pressure-sensitive sensor 52 according to the second embodiment. Further, the pressure-sensitive sensor 20 according to the second embodiment includes a deformable layer 46 instead of the fixation layer 45 of the pressure-sensitive sensor 20 according to the first embodiment.

For convenience, the deformable layer situated on the side of the first electrode film layer 35 (on the side of the first reference electrode layer 35a) is referred to as the first deformable layer 37 in the description of the second embodiment (simply referred to as the deformable layer 37 in the first embodiment). Further, the deformable layer situated on the side of the second electrode film layer 36 (on the side of the second reference electrode layer 36a) is referred to as a second deformable layer 46.

As illustrated in FIG. 21, the pressure-sensitive sensor 52 includes the first electrode film layer 35, the first deformable layer 37, the sensor electrode layer 27, the second deformable layer 46, and the second electrode film layer 36 in order from above (from the outside) in the stacking direction (the Z-axis direction). For example, the pressure-sensitive sensor 52 is bonded to two surfaces (for example, the upper surface of the frame 6 and the lower surface of the display section 13) through bonding layers (such as double-faced tapes), the two surfaces being surfaces between which the pressure-sensitive sensor 52 is situated.

Regarding the sensor electrode layer 27, the first electrode film layer 35, and the second electrode film layer 36, the second embodiment is similar to the first embodiment described above.

The first deformable layer 37 is situated between the sensor electrode layer 27 and the first electrode film layer 35. Further, the second deformable layer 46 is situated between the sensor electrode layer 27 and the second electrode film layer 36.

The first deformable layer 37 and the second deformable layer 46 are different from each other in at least one of structure or material. FIG. 21 illustrates an example in which the deformable layers are different from each other in both structure and material.

Specifically, in the example illustrated in FIG. 21, the first deformable layer 37 includes a patterning structure including a hollow portion. The patterning structure includes a plurality of second pillar portions 38 (the first support 38a and the second support 38b) arranged in a direction horizontal to the layers.

For example, an adhesive or double-faced tape that includes an insulation layer is used as a material of the second pillar portion 38, as described above. From the viewpoint of improvement in sensitivity, the thickness of the first deformable layer 37 is typically not greater than 500 μm, not greater than 300 μm, or not greater than 200 μm.

On the other hand, the second deformable layer 46 does not include a patterning structure, but includes an infilling structure obtained by filling a material into a space between the sensor electrode layer 27 and the second electrode film layer 36. The second deformable layer 46 is bonded to a lower surface of the sensor electrode layer 27 and an upper surface of the second electrode film layer 36 respectively through bonding layers 47 and 48. Examples of a material of the second deformable layer 46 include plastic foam, an insulating elastomer, and a (thin) metallic spring (the same material as the clearance layer 21 described above). From the viewpoint of improvement in sensitivity, the thickness of the second deformable layer 46 is typically not greater than 500 μm, not greater than 300 μm, or not greater than 200 μm.

The example in which the first deformable layer 37 and the second deformable layer 46 are different from each other in both structure and material has been described above. However, it is typically sufficient if the first deformable layer 37 and the second deformable layer 46 are different from each other in at least one of structure or material.

In other words, it is sufficient if the first deformable layer 37 and the second deformable layer 46 include different structures although they are made of the same material. Examples of the case in which the first deformable layer 37 and the second deformable layer 46 include different structures include a case in which one of the deformable layers includes a patterning structure and another of the deformable layers includes an infilling structure (FIG. 21), and a case in which one of the deformable layers includes a patterning structure, and another of the deformable layers includes a different patterning structure.

Note that examples of the patterning structure include a matrix structure, a stripe structure, a mesh structure, a radial structure, a geometric structure, and a spiral structure, as described above. Note that the first deformable layer 37 and the second deformable layer 46 may each typically include any structure as long as the deformable layers include different structures.

Further, it is sufficient if the first deformable layer 37 and the second deformable layer 46 are made of different materials although they include the same structure. Examples of a case in which both the first deformable layer 37 and the second deformable layer 46 include the same infilling structure include a case in which plastic foam is used as a material of one of the deformable layers, and an insulating elastomer is selected as a material of another of the deformable layers. Further, examples of a case in which both the first deformable layer 37 and the second deformable layer 46 include the same patterning structure include a case in which a certain double-faced tape is used as a material of one of the deformable layers, and another double-faced tape is used as a material of another of the deformable layers. Note that any material may typically be used for each of the first deformable layer 37 and the second deformable layer 46 as long as the deformable layers are made of different materials.

Further, at least one of the first deformable layer 37 or the second deformable layer 46 may include at least two layers that are different from each other in structure or material. In this case, the total number of deformable layers is three or more.

<Comparison with Comparative Examples>

Figure 22:
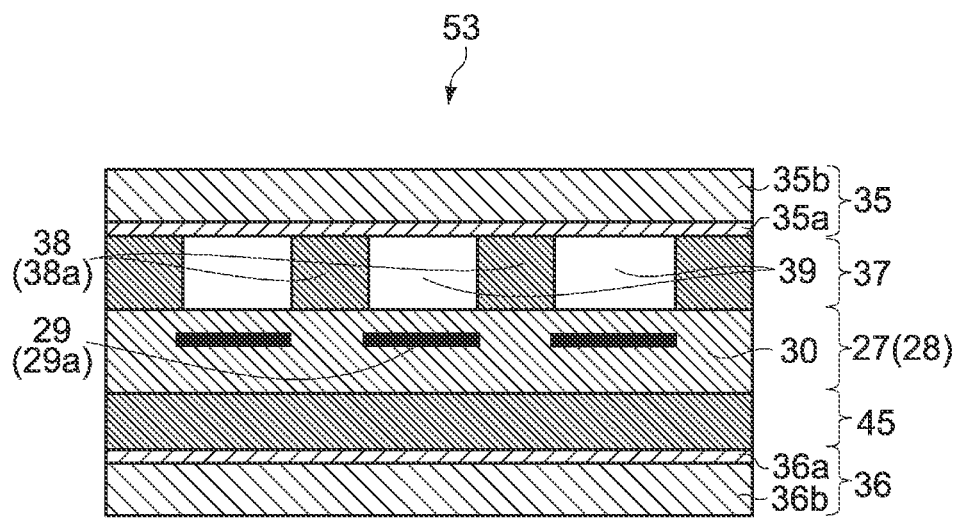
FIG. 22 illustrates a pressure-sensitive sensor according to a comparative example.
Figure 23:
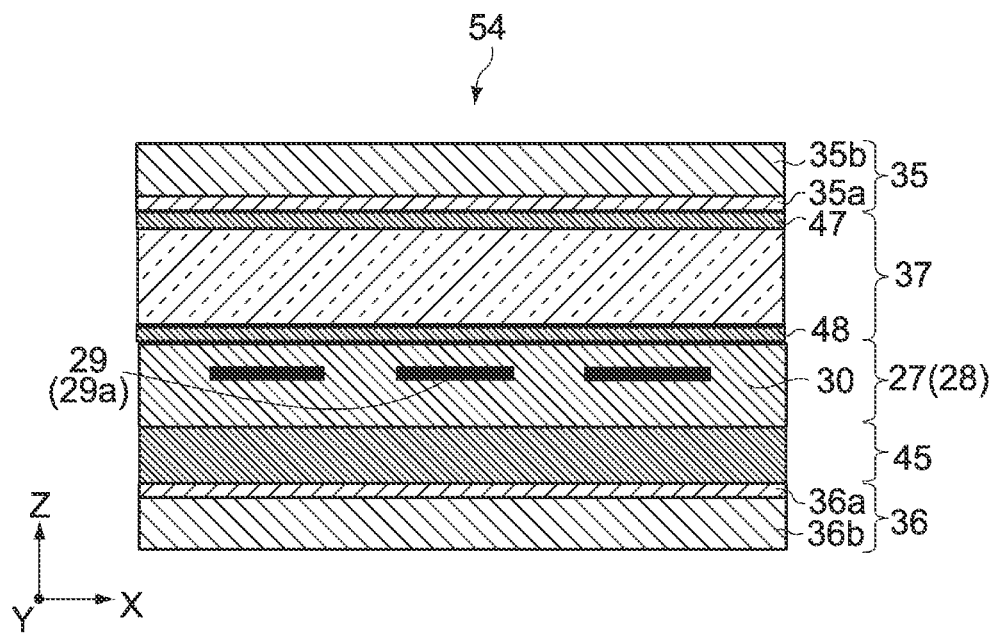
FIG. 23 illustrates another pressure-sensitive sensor according to a comparative example.

Next comparative examples are described. FIG. 22 illustrates a pressure-sensitive sensor 53 according to a comparative example. FIG. 23 illustrates another pressure-sensitive sensor 54 according to a comparative example.

The pressure-sensitive sensor 53 according to the comparative example of FIG. 22 is different from the pressure-sensitive sensor 52 according to the second embodiment illustrated in FIG. 21 in including the fixation layer 45 instead of the second deformable layer 46. Regarding the other points, the comparative example of FIG. 22 is similar to the example illustrated in FIG. 21.

Further, the pressure-sensitive sensor 54 according to the comparative example of FIG. 23 is different from the pressure-sensitive sensor 52 according to the second embodiment illustrated in FIG. 21 in including the fixation layer 45 instead of the second deformable layer 46, and in that the first deformable layer 37 includes an infilling structure made of plastic foam. Regarding the other points, the comparative example of FIG. 23 is similar to the example illustrated in FIG. 21.

Figure 24:
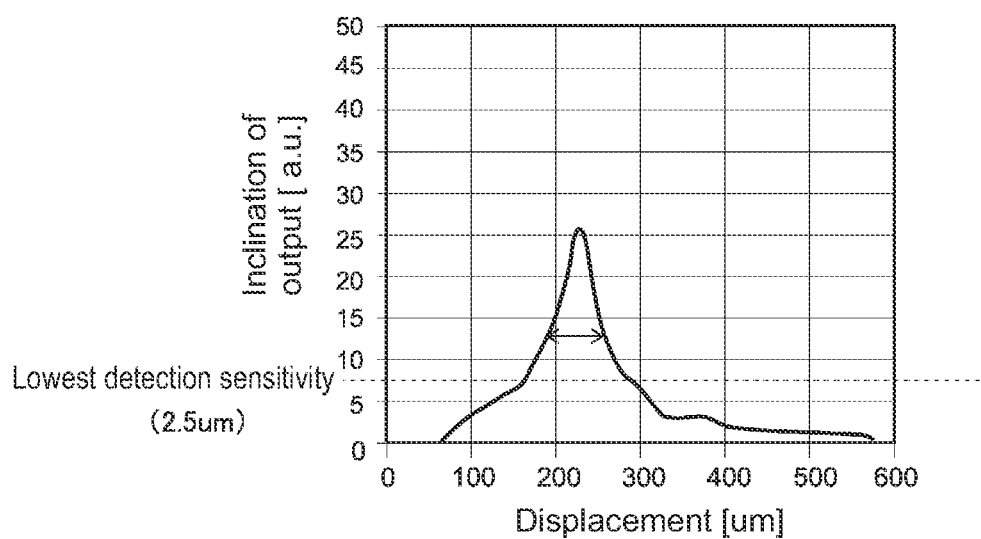
FIG. 24 illustrates a waveform of an inclination of a value of sensor output with respect to displacement in the pressure-sensitive sensor according to the comparative example of FIG. 22.

FIG. 24 illustrates a waveform of an inclination of a value of sensor output with respect to displacement in the pressure-sensitive sensor 53 according to the comparative example of FIG. 22. In the case of the comparative example illustrated in FIG. 22, the lowest detection sensitivity of 2.5 µm is satisfied in a displacement range of between 160 µm and 280 µm. Further, with respect to the operating load, the condition of "a largest value Max of an operating load/a smallest value Min of the operating load ≤2" is satisfied in a displacement range of between 191 µm and 259 µm (refer to an arrow). Thus, the range of ensuring of tolerances is 68 µm (=191–259) in this comparative example.

Note that displacement that corresponds to a smallest value Min of an operating load is at a displacement point of 225 µm at which the inclination of a value of sensor output exhibits a largest value (25.9/µm). Further, displacement that corresponds to a largest value Max of the operating load is at displacement points of 191 µm and 259 µm at which the inclination of a value of sensor output exhibits a value half the largest value (12.45/µm).

Figure 25:
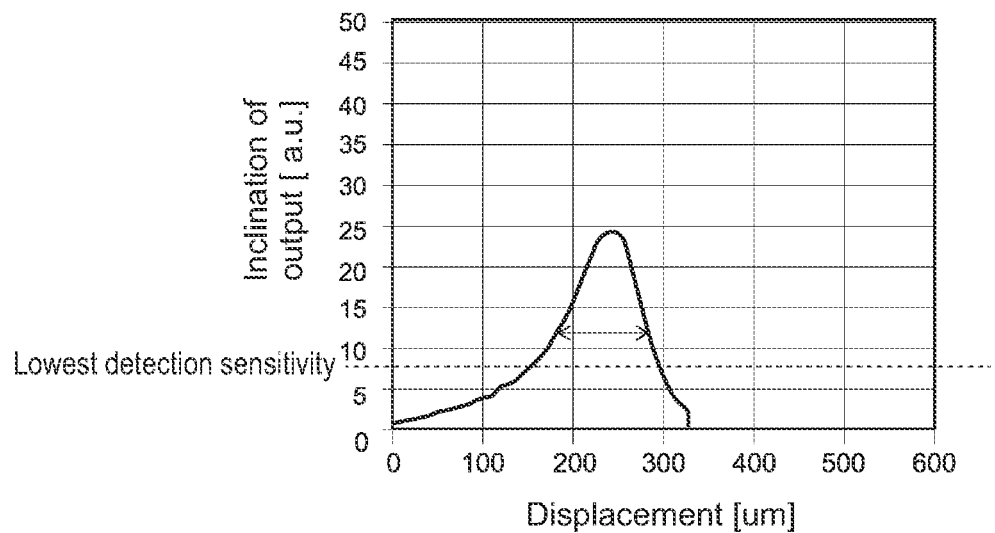
FIG. 25 illustrates a waveform of an inclination of a value of sensor output with respect to displacement in the pressure-sensitive sensor according to the comparative example of FIG. 23.

FIG. 25 illustrates a waveform of an inclination of a value of sensor output with respect to displacement in the pressure-sensitive sensor 54 according to the comparative example of FIG. 23. In the case of the comparative example illustrated in FIG. 23, the lowest detection sensitivity of 2.5 µm is satisfied in a displacement range of between 150 µm and 295 µm. Further, with respect to the operating load, the condition of "a largest value Max of an operating load/a smallest value Min of the operating load ≤2" is satisfied in a displacement range of between 175 µm and 275 µm (refer to an arrow). Thus, the range of ensuring of tolerances is 100 µm (=275–175) in this comparative example.

Note that displacement that corresponds to a smallest value Min of an operating load is at a displacement point of 245 µm at which the inclination of a value of sensor output exhibits a largest value (24.7/µm). Further, displacement that corresponds to a largest value Max of the operating load is at displacement points of 175 µm and 275 µm at which the inclination of a value of sensor output exhibits a value half the largest value (12.35/µm).

Figure 26:
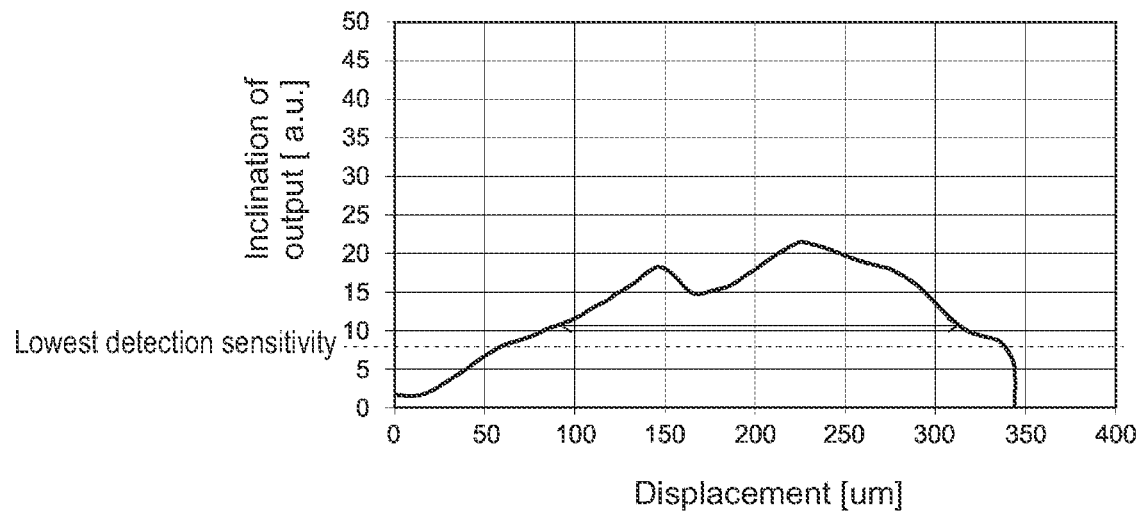
FIG. 26 illustrates a waveform of an inclination of a value of sensor output with respect to displacement in the pressure-sensitive sensor according to the second embodiment.

Next, a waveform of an inclination of a value of sensor output in the pressure-sensitive sensor 51 according to the second embodiment illustrated in FIG. 21 is described. FIG. 26 illustrates a waveform of an inclination of a value of sensor output with respect to displacement in the pressure-sensitive sensor 51 illustrated in FIG. 21.

In the case of the embodiment illustrated in FIG. 21, the lowest detection sensitivity of 2.5 µm is satisfied in a displacement range of between 60 µm and 380 µm. Further, with respect to the operating load, the condition of "a largest value Max of an operating load/a smallest value Min of the operating load ≤2" is satisfied in a displacement range of between 80 µm and 330 µm (refer to an arrow). Thus, the range of ensuring of tolerances is 250 µm (=330–250) in this embodiment.

Note that displacement that corresponds to a smallest value Min of an operating load is at a displacement point of 225 µm at which the inclination of a value of sensor output exhibits a largest value (22/µm). Further, displacement that corresponds to a largest value Max of the operating load is at displacement points of 80 µm and 330 µm at which the inclination of a value of sensor output exhibits a value half the largest value (11/µm).

The waveform illustrated in FIG. 26 is like a waveform obtained by combining the waveform illustrated in FIG. 24 and the waveform illustrated in FIG. 25. The reason is that, with respect to a range of ensuring of tolerances in the embodiment illustrated in FIG. 21, the first deformable layer 37 plays the role of the deformable layer 37 (for example, a double-faced tape in the case of a patterning structure) in the comparative example of FIG. 22, and the second deformable layer 46 plays the role of the deformable layer 37 (for example, plastic foam) in the comparative example of FIG. 23.

In other words, the second embodiment broadens a range of ensuring of tolerances by using the two deformable layers 37 and 46 for which the respective positions of a point (displacement) at which an inclination of a value of sensor output exhibits a largest value, are different. Note that, when the two deformable layers 37 and 46 are different from each other in at least one of structure or material, the deformable layers 37 and 46 are basically different from each other in the position of a point (displacement) at which an inclination of a value of sensor output exhibits a largest value.

As in the case of the first embodiment, the value of the inclination of sensor output with respect to displacement varies in the form of a mountain with a peak in the second embodiment, as illustrated in FIG. 26, but is closer to being constant than those of the comparative examples (refer to FIGS. 24 and 25). In other words, as in the case of the first embodiment, the second embodiment provides a near-ideal state in which a value of sensor output equally varies with respect to any displacement (refer to FIG. 11). Note that an illustration of a waveform of a value of sensor output (not the waveform of the inclination thereof) is omitted in the second embodiment. However, it is understood, from FIG. 26, that a near-ideal waveform of the value of sensor output is also obtained (refer to FIG. 10), that is, the waveform of the value of sensor output is close to being linear.

Further, as in the case of the first embodiment, the range of ensuring of tolerances is wide in the second embodiment. In this embodiment, the range of ensuring of tolerances is 250 µm, which sufficiently satisfies the condition of a range of ensuring of tolerances that is equal to or greater than 125 µm under the condition of Max/Min≤2.

Various Examples and Various Comparative Examples

Next, various examples and various comparative examples in the second embodiment are described. FIG. 27 illustrates various examples and various comparative examples in the second embodiment.

In a seventh example, "SF-PC5900-C" of TATSUTA Electric Wire and Cable Co., Ltd. was used as a material of the first electrode film layer 35 and the second electrode film layer 36. "SF-PC5900-C" having a thickness of 67 µm was used.

Further, in the seventh example, the first deformable layer 37 includes a patterning structure including the second pillar portion 38. "Neo Fix" of Nichiei Kako Co., Ltd. (registered trademark) was used as a material of the second pillar portion 38. Neo Fix having a thickness of 100 µm was used.

Furthermore, in the seventh example, the second deformable layer 46 includes an infilling structure, and PORON "SS-24P" of Rogers Inoac Corporation (registered trademark) was used as a material of the second deformable layer 46. "SS-24P" having a thickness of 300 µm was used.

In the seventh example, the sensitivity at the time of deformation of 5 µm was 15, and the range of ensuring of tolerances was 270 µm.

An eighth example is different from the seventh example in that the second deformable layer 46 has a thickness of 500 μm instead of having a thickness of 300 μm. Regarding the other points, the eighth example is similar to the seventh example. In the eighth example, the sensitivity at the time of deformation of 5 μm was 10, and the range of ensuring of tolerances was 250 μm. Note that the waveform illustrated in FIG. 26 corresponds to the eighth example.

A ninth example is different from the seventh example in that the first deformable layer 37 has a thickness of 200 μm instead of having a thickness of 100 μm. Regarding the other points, the ninth example is similar to the seventh example. In the ninth example, the sensitivity at the time of deformation of 5 μm was 10, and the range of ensuring of tolerances was 200 μm.

A third comparative example is different from the seventh example in not including the second deformable layer 46, and in including the fixation layer 45 instead. The fixation layer 45 is formed by filling a space corresponding to the fixation layer 45 with Neo Fix having a thickness of 100 μm. Regarding the other points, the third comparative example is similar to the seventh example. In the third comparative example, the sensitivity at the time of deformation of 5 μm was 15, and the range of ensuring of tolerances was 100 μm.

A fourth comparative example is different from the seventh example in not including the second deformable layer 46, and in including the fixation layer 45 instead. The fixation layer 45 is formed by filling a space corresponding to the fixation layer 45 with Neo Fix having a thickness of 100 μm. Further, the fourth comparative example is different from the seventh example in that the first deformable layer 37 does not include a patterning structure, but includes an infilling structure filled with "SF-PC5900-C". Furthermore, the fourth comparative example is different from the seventh example in that the first deformable layer 37 has a thickness of 300 μm instead of having a thickness of 100 μm. Regarding the other points, the fourth comparative example is similar to the seventh example. In the fourth comparative example, the sensitivity at the time of deformation of 5 μm was 15, and the range of ensuring of tolerances was 120 μm.

Effects and Others

As described above, the pressure-sensitive sensor 52 according to the second embodiment includes the two deformable layers 37 and 46 that are different from each other in at least one of structure or material. Accordingly, the second embodiment uses the two deformable layers 37 and 46 for which the respective positions of a point (displacement) at which an inclination of a value of sensor output exhibits a largest value, are different. Further, a waveform of the inclination of a value of sensor output is like a waveform obtained by combining respective waveforms for the two deformable layers 37 and 46.

Accordingly, a near-ideal waveform of a value of sensor output can be obtained (a waveform of a value of sensor output can be close to being linear), and a near-ideal waveform of a value of an inclination of the value of sensor output can also be obtained (a waveform of an inclination of the value of sensor output can also be close to being linear). Consequently, the present embodiment makes it possible to broaden the range of ensuring of tolerances, and to properly ensure tolerances due to various causes.

Further, one of the first deformable layer 37 and the second deformable layer 46 includes a patterning structure, and another of the first deformable layer 37 and the second deformable layer 46 is made of plastic foam. This makes it possible to more properly broaden the range of ensuring of tolerances.

Third Embodiment

Next, a third embodiment of the present technology is described. FIG. 28 is a side view schematically illustrating a pressure-sensitive sensor 55 according to the third embodiment.

The pressure-sensitive sensor 55 according to the third embodiment is different from the pressure-sensitive sensor 20 according to the first embodiment in including the second deformable layer 46 instead of the fixation layer 45. Further, the pressure-sensitive sensor 55 according to the third embodiment is different from the pressure-sensitive sensor 52 according to the second embodiment in that the clearance layer 21 and the push-in layer 23 are added to the pressure-sensitive sensor 55 according to the third embodiment. Regarding the other points, the third embodiment is similar to the first embodiment and the second embodiment, and thus a detailed description thereof is omitted.

In the pressure-sensitive sensor 20 according to the third embodiment, it is possible to broaden the range of ensuring of tolerances using the push-in layer 23, and to broaden the range of ensuring of tolerances using the first deformable layer 37 and the second deformable layer 46 being different from each other in structure or material. Those two effects result in a further broadened range of ensuring of tolerances.

All of the matter described above in the first embodiment and all of the matter described above in the second embodiment are applicable to the third embodiment.

Various Modifications

The smartphone 100 has been described above as an example of an electronic apparatus that includes the pressure-sensitive sensor 20. On the other hand, the electronic apparatus is not limited to the smartphone 100. Other examples of the electronic apparatus include a tablet personal computer (PC), a portable game machine, a portable music player, a wearable apparatus, and a virtual reality apparatus. Note that the pressure-sensitive sensor 20 is applicable to any type of electronic apparatus as long as the pressure-sensitive sensor 20 is used to detect pressure.

Further, something that is apparently not included in examples of an electronic apparatus is considered an apparatus using electronic engineering by including (therein) the pressure-sensitive sensor 20. For example, furniture and an architectural member are apparently not included in examples of an electronic apparatus. However, they are respectively considered apparatuses using electronic engineering by including (therein) the pressure-sensitive sensor 20. Thus, furniture and an architectural member each including the pressure-sensitive sensor 20 are respectively considered electronic apparatuses (that is, anything including the pressure-sensitive sensor 20 is considered an electronic apparatus).

The present technology may also take the following configurations.

(1) A pressure-sensitive sensor, including:

a sensor section that includes a sensor electrode layer, a first reference electrode layer, and a first deformable layer that is situated between the sensor electrode layer and the first reference electrode layer;

a clearance layer that is situated outside of the sensor section to face the first reference electrode layer; and a push-in layer that is situated between the first reference electrode layer and the clearance layer, the push-in layer pushing the first reference electrode layer toward the sensor electrode layer in response to an external force to deform the first deformable layer.

(2) The pressure-sensitive sensor according to (1), in which the push-in layer includes a first patterning structure that is situated between the first reference electrode layer and the clearance layer.

(3) The pressure-sensitive sensor according to (2), in which the first patterning structure includes a plurality of first pillar portions arranged in a direction horizontal to the layers.

(4) The pressure-sensitive sensor according to (3), in which the first deformable layer includes a second patterning structure that is situated between the sensor electrode layer and the first reference electrode layer.

(5) The pressure-sensitive sensor according to (4), in which the second patterning structure includes a plurality of second pillar portions arranged in the direction horizontal to the layers.

(6) The pressure-sensitive sensor according to (5), in which the first deformable layer includes a hollow portion in which there is not the second pillar portion of the plurality of second pillar portions, and each of the plurality of first pillar portions is arranged at a position that corresponds to the hollow portion in a stacking direction vertical to the layers.

(7) The pressure-sensitive sensor according to any one of (3) to (6), in which the sensor electrode layer includes a sensing portion, and each of the plurality of first pillar portions is arranged at a position that corresponds to the sensing portion in a stacking direction vertical to the layers.

(8) The pressure-sensitive sensor according to any one of (1) to (7), in which the clearance layer includes plastic foam.

(9) The pressure-sensitive sensor according to any one of (1) to (8), in which the push-in layer is made of a material harder than a material of the clearance layer.

(10) The pressure-sensitive sensor according to any one of (1) to (9), in which the sensor section further includes a second reference electrode layer that is arranged such that the sensor electrode layer is situated between the first reference electrode layer and the second reference electrode layer.

(11) The pressure-sensitive sensor according to (10), in which the sensor section further includes a second deformable layer that is situated between the sensor electrode layer and the second reference electrode layer.

(12) The pressure-sensitive sensor according to (11), in which the first deformable layer and the second deformable layer are different from each other in at least one of structure or material.

(13) The pressure-sensitive sensor according to (12), in which one of the first deformable layer and the second deformable layer includes a patterning structure.

(14) The pressure-sensitive sensor according to (13), in which the patterning structure includes a plurality of pillar portions arranged in a direction horizontal to the layers.

(15) The pressure-sensitive sensor according to (13) or (14), in which another of the first deformable layer and the second deformable layer includes plastic foam.

(16) An electronic apparatus, including:
an exterior body; and
a pressure-sensitive sensor that detects an external force applied through the exterior body,
the pressure-sensitive sensor including
a sensor section that includes a sensor electrode layer, a first reference electrode layer, and a first deformable layer that is situated between the sensor electrode layer and the first reference electrode layer,
a clearance layer that is situated outside of the sensor section to face the first reference electrode layer, and
a push-in layer that is situated between the first reference electrode layer and the clearance layer, the push-in layer pushing the first reference electrode layer toward the sensor electrode layer in response to the external force to deform the first deformable layer.

REFERENCE SIGNS LIST

10 housing
20 (20a, 20b), 52, 55 pressure-sensitive sensor
21 clearance layer
23 push-in layer
26 sensor section
27 sensor electrode layer
35 first electrode film layer
36 second electrode film layer
37 deformable layer (first deformable layer)
46 second deformable layer
100 smartphone

The invention claimed is:

1. A pressure-sensitive sensor, comprising:
a sensor section that includes a sensor electrode layer, a first reference electrode layer, and a first deformable layer that is situated between the sensor electrode layer and the first reference electrode layer;
a clearance layer that is situated outside of the sensor section to face the first reference electrode layer; and
a push-in layer that is situated between the first reference electrode layer and the clearance layer, wherein the push-in layer is configured to push the first reference electrode layer toward the sensor electrode layer in response to an external force to deform the first deformable layer.

2. The pressure-sensitive sensor according to claim 1, wherein
the push-in layer includes a first patterning structure that is situated between the first reference electrode layer and the clearance layer.

3. The pressure-sensitive sensor according to claim 2, wherein
the first patterning structure includes a plurality of first pillar portions arranged in a direction horizontal to the layers.

4. The pressure-sensitive sensor according to claim 3, wherein
the first deformable layer includes a second patterning structure that is situated between the sensor electrode layer and the first reference electrode layer.

5. The pressure-sensitive sensor according to claim 4, wherein
the second patterning structure includes a plurality of second pillar portions arranged in the direction horizontal to the layers.

6. The pressure-sensitive sensor according to claim 5, wherein
the first deformable layer includes a hollow portion in which there is not the second pillar portion of the plurality of second pillar portions, and
each of the plurality of first pillar portions is arranged at a position that corresponds to the hollow portion in a stacking direction vertical to the layers.

7. The pressure-sensitive sensor according to claim 3, wherein
the sensor electrode layer includes a sensing portion, and
each of the plurality of first pillar portions is arranged at a position that corresponds to the sensing portion in a stacking direction vertical to the layers.

8. The pressure-sensitive sensor according to claim 1, wherein
the clearance layer includes plastic foam.

9. The pressure-sensitive sensor according to claim 1, wherein
the push-in layer is made of a material harder than a material of the clearance layer.

10. The pressure-sensitive sensor according to claim 1, wherein
the sensor section further includes a second reference electrode layer that is arranged such that the sensor electrode layer is situated between the first reference electrode layer and the second reference electrode layer.

11. The pressure-sensitive sensor according to claim 10, wherein
the sensor section further includes a second deformable layer that is situated between the sensor electrode layer and the second reference electrode layer.

12. The pressure-sensitive sensor according to claim 11, wherein
the first deformable layer and the second deformable layer are different from each other in at least one of structure or material.

13. The pressure-sensitive sensor according to claim 12, wherein
one of the first deformable layer and the second deformable layer includes a patterning structure.

14. The pressure-sensitive sensor according to claim 13, wherein
the patterning structure includes a plurality of pillar portions arranged in a direction horizontal to the layers.

15. The pressure-sensitive sensor according to claim 13, wherein
another of the first deformable layer and the second deformable layer includes plastic foam.

16. An electronic apparatus, comprising:
an exterior body; and
a pressure-sensitive sensor configured to detect an external force applied through the exterior body, wherein the pressure-sensitive sensor includes:
a sensor section that includes a sensor electrode layer, a first reference electrode layer, and a first deformable layer that is situated between the sensor electrode layer and the first reference electrode layer,
a clearance layer that is situated outside of the sensor section to face the first reference electrode layer, and
a push-in layer that is situated between the first reference electrode layer and the clearance layer, wherein the push-in layer is configured to push the first reference electrode layer toward the sensor electrode layer in response to the external force to deform the first deformable layer.

* * * * *